(12) United States Patent
Leone

(10) Patent No.: US 10,428,784 B2
(45) Date of Patent: *Oct. 1, 2019

(54) METHOD AND SYSTEM FOR CONTROLLING FUEL USAGE

(71) Applicant: Ford Global Technologies, LLC, Dearborn, MI (US)

(72) Inventor: Thomas G. Leone, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 756 days.

This patent is subject to a terminal disclaimer.

(21) Appl. No.: 14/049,025

(22) Filed: Oct. 8, 2013

(65) Prior Publication Data

US 2014/0034013 A1 Feb. 6, 2014

Related U.S. Application Data

(63) Continuation of application No. 12/846,730, filed on Jul. 29, 2010, now Pat. No. 8,554,445.

(51) Int. Cl.
*F02P 5/00* (2006.01)
*F02D 35/02* (2006.01)
(Continued)

(52) U.S. Cl.
CPC .............. *F02P 5/00* (2013.01); *F02D 35/027* (2013.01); *F02D 37/02* (2013.01);
(Continued)

(58) Field of Classification Search
CPC .... F02D 9/02; F02D 19/0649; F02D 19/0655; F02D 33/02; F02D 41/0002; F02D 41/0025; F02D 19/12; F02D 2041/0015; F02M 25/14; F02M 43/00; F02M 2700/4321
(Continued)

(56) References Cited

U.S. PATENT DOCUMENTS

| 4,541,383 A | 9/1985 | Jessel |
| 4,729,358 A | 3/1988 | Morita et al. |

(Continued)

FOREIGN PATENT DOCUMENTS

| JP | 2001271672 A | 10/2001 |
| WO | 2004111416 A1 | 12/2004 |

OTHER PUBLICATIONS

Stein, Robert A., "Optimal Use of E85 in a Turbocharged Direct Injection Engine", Ford Motor Company, SAE International 2009, 2009-01-1490, 13 Pgs.
(Continued)

*Primary Examiner* — Erick R Solis
*Assistant Examiner* — Anthony L Bacon
(74) *Attorney, Agent, or Firm* — Geoffrey Brumbaugh; McCoy Russell LLP

(57) ABSTRACT

Methods and systems are provided for improving fuel usage while addressing knock by adjusting the use of spark retard and direct injection of a knock control fluid based on engine operating conditions and the composition of the injected fluid. One or more engine parameters, such as EGR, VCT, boost, throttle position, and CMCV, are coordinated with the direct injection to reduce torque and EGR transients.

14 Claims, 10 Drawing Sheets

(51) Int. Cl.
  *F02D 37/02* (2006.01)
  *F02D 41/00* (2006.01)
  *F02P 5/152* (2006.01)
(52) U.S. Cl.
  CPC ..... *F02D 41/0002* (2013.01); *F02D 41/0025* (2013.01); *F02P 5/152* (2013.01); *F02P 5/1523* (2013.01); *F02P 5/1527* (2013.01); *F02D 2041/002* (2013.01); *F02D 2041/0017* (2013.01); *F02D 2200/0611* (2013.01); *Y02T 10/42* (2013.01); *Y02T 10/46* (2013.01)
(58) Field of Classification Search
  USPC ........ 123/25 A, 25 B, 25 C, 25 D, 295, 299, 123/300, 305, 306, 308, 430, 432, 435, 123/436, 478, 480, 494, 1 A, 304, 301, 123/336, 344, 406.29, 406.31, 406.45, 123/406.47, 431, 442, 575, 577, 198 A; 701/102–105, 110, 111, 115
  See application file for complete search history.

(56) References Cited

U.S. PATENT DOCUMENTS

| | | | |
|---|---|---|---|
| 6,415,745 | B1 | 7/2002 | Hellen et al. |
| 6,892,691 | B1 | 5/2005 | Uhl et al. |
| 6,932,054 | B2 | 8/2005 | Kikori |
| 6,951,202 | B2 | 10/2005 | Oda |
| 6,990,956 | B2 | 1/2006 | Niimi |
| 7,047,940 | B2 | 5/2006 | Niimi |
| 7,052,597 | B2 | 5/2006 | Weissman et al. |
| 7,077,105 | B2 | 7/2006 | Oda et al. |
| 7,159,568 | B1 | 1/2007 | Lewis et al. |
| 7,278,396 | B2 | 10/2007 | Leone et al. |
| 7,287,492 | B2 | 10/2007 | Leone et al. |
| 7,320,297 | B2 | 1/2008 | Kamio et al. |
| 7,367,310 | B2 | 5/2008 | Kakuya et al. |
| 7,395,786 | B2 | 7/2008 | Leone et al. |
| 7,421,999 | B2 | 9/2008 | Kim et al. |
| 7,428,895 | B2 | 9/2008 | Leone et al. |
| 7,556,030 | B2 | 7/2009 | Ashida et al. |
| 7,749,308 | B2 | 7/2010 | McCully |
| 7,769,527 | B2 | 8/2010 | Noda et al. |
| 7,938,098 | B2 | 5/2011 | Ashizawa |
| 8,096,283 | B2 | 1/2012 | Surnilla et al. |
| 8,127,745 | B2 | 4/2012 | Surnilla et al. |
| 8,175,789 | B2 * | 5/2012 | Kojima et al. ............... 701/104 |
| 8,315,788 | B2 | 11/2012 | Surnilla et al. |
| 8,352,162 | B2 | 1/2013 | Leone et al. |
| 8,483,937 | B2 | 7/2013 | Surnilla et al. |
| 8,554,445 | B2 * | 10/2013 | Leone ........................ 701/103 |
| 2004/0261414 | A1 * | 12/2004 | Araki ............................ 60/602 |
| 2006/0254558 | A1 * | 11/2006 | Doering et al. .......... 123/198 F |
| 2007/0119422 | A1 | 5/2007 | Lewis et al. |
| 2007/0215110 | A1 * | 9/2007 | Stein et al. .................. 123/431 |
| 2008/0022982 | A1 | 1/2008 | Kamiyama |
| 2008/0223344 | A1 | 9/2008 | Suzuki et al. |
| 2008/0236546 | A1 | 10/2008 | Kakuho et al. |
| 2009/0308367 | A1 | 12/2009 | Glugla |
| 2010/0006050 | A1 | 1/2010 | Bromberg et al. |
| 2010/0057327 | A1 * | 3/2010 | Glugla et al. ................. 701/103 |

OTHER PUBLICATIONS

Hill, Jason et al., "Climate change and health costs of air emissions from biofuels and gasoline," PNAS, Feb. 10, 2009, vol. 106, No. 6, pp. 2077-2082, 6 pages.
Anderson, James E. et al., "Implications of the Energy Independence and Security Act of 2007 for the US Light-Duty Vehicle Fleet," SAE Technical Paper 09FFL-0302 (2009-01-2770), 2009, 11 pages.
Heywood, John B., "Internal Combustion Engine Fundamentals," McGraw-Hill, Inc.: New York, 1988, pp. 915, 457-458, and 471-473, 9 pages.
Poling, Bruce E. et al., "The Properties of Gases and Liquids," 5th ed.; McGraw-Hill, Inc.: New York, 2001, 5 pages.
Hunwartzen, I., "Modification of CFR Test Engine unit to Determine Octane Numbers of Pure Alcohols and Gasoline-Alcohol Blends," SAE Techniocal Paper 820002, 1982, 7 pages.
Andersen, V. F. et al., "Vapor Pressures of Alcohol—Gasoline Blends," Energy Fuels 2010, 24, 3647-3654, Published on Web May 21, 2010, 8 pages.
Andersen, V. F. et al., "Distillation Curves for Alcohol—Gasoline Blends," Energy Fuels 2010, 24, 2683-2691, Published on Web Mar. 15, 2010, 9 pages.
Mueller, Sherry A. et al., "A Classroom Demonstration of Water-Induced Phase Separation of Alcohol-Gasoline Biofuel Blends," Journal of Chemical Education, Sep. 9, 2009, vol. 86, No. 9, pp. 1045-1048, 4 pages.
Wigg, Eric E. et al., "Methanol as a Gasoline Extender—Fuel Economy, Emissions, and High Temperature Driveability," SAE Technical Paper 741008, 1974, 3 pages.
Stein, Robert A., "Optimal Use of E85 in a Turbocharged Direct Injection Engine," SAE Technical Paper 2009-01-1490, 2009, 13 pages.
Milpied, Jean et al., "Impact of Fuel Properties on the Performances and Knock Behaviour of a Downsized Turbocharged DI SI Engine—Focus on Octane Numbers and Latent Heat of Vaporization," SAE Technical Paper 2009-01-0324, 2009, 9 pages.
Bauer, K. et al., "Abschlussbereicht: Klopffestigkeitsbestimmung (ROZ und MOZ) von Alkoholen und Alkoholmischkraftstoffen in CFR-Pruefmotoren" (German), DGMK Forschungsbericht 260-01, 1980, 34 pages.
Hamilton, B. et al., "Motor Gasoline" in Fuels and Lubricants Handbook: Technologies, Properties, Performance, and Testing, Totten, G. E., Editor, ASTM International: West Conshohocken, PA, 2003, 30 pages.
Russ, Stephen, "A Review of the Effect of Engine Operating Conditions on Borderline Knock," SAE Technical Paper 960497, International Congress & Exposition, Detroit, Michigan, Feb. 26-29, 1996, 12 pages.
Nakata, Koichi et al., "The Impact of RON on SI Engine Thermal Efficiency," SAE Technical Paper 2007-01-2007, 2007, 7 pages.
Searle, George R., "Octane Quality and Knock" in Motor Gasoline, Marshall, E. L.; Owen, K., Editors, The Royal Society of Chemistry: Cambridge, 1995, 3 pages.
Snelgrove, David G., "Motor Gasoline Specifications and Stability" in Motor Gasoline, Marshall, E. L.; Owen, K., Editors, The Royal Society of Chemistry: Cambridge, 1995, 3 pages.
ASTM International. ASTM D2699-07. "Standard Test Method for Research Octane Number of Spark-Ignition Engine Fuel," West Conshohocken, PA, Apr. 2007, 41 pages.
ASTM International. ASTM D2700-09. "Standard Test Method for Motor Octane Numbers of Spark-Ignition Engine Fuel," West Conshohocken, PA, Nov. 2009, 54 pages.
Moran, Derek P., "The Effects of Fuel Evaporation on the Octane Numbers of Methanol-Gasoline Blended Fuels," SAE Technical Paper 941861, Fuels and Lubricants Meeting & Exposition, Baltimore, Maryland, Oct. 17-20, 1994, 10 pages.
Houben, Maurice C. M., "Oxygenated Blending Components for Gasoline—Alcohols and Ethers" in Motor Gasoline, Marshall, E. L.; Owen, K., Editors, The Royal Society of Chemistry: Cambridge, 1995, 3 pages.
Deutsches Institut für Normung, DIN 51756-7, "Determination of knock characteristics (octane number) of alcohols and alcohol/fuel mixtures using the CFR engine", 1986, 4 pages.
Johnson, R. T. and Riley, R. K. "Evaluation of Methyl Alcohol as a Vehicle Fuel Extender", U. S. Department of Transportation, DOT-TST-76-50, Aug. 1975, 174 pages.
Most, W. J. et al, "Single-Cyliner Engine Evaluation of Methanol-Improved Energy Economy and Reduced NOx," SAE Technical Paper 750119, 1975, 11 pages.
Szybist, James et al., "Investigation of Knock Limited Compression Ration of Ethanol Gasoline Blends," SAE Technical Paper 2010-01-0619, 2010, 16 pages.

(56) References Cited

OTHER PUBLICATIONS

Johnson, R. T. et al., "Single Cylinder Spark Ignition Engine Study of the Octane, Emissions, and Fuel Economy Characteristics of Methanol-Gasoline Blends," SAE Technical Paper 760377, 1976, 12 pages.

Brinkman, N. D. et al, "Exhaust Emissions, Fuel Economy, and Driveability of Vehicles Fueled with Alcohol-Gasoline Blends," SAE Technical Paper 750120, Automotive Engineering Congress and Exposition, Detroit, Michigan, Feb. 24-28, 1975, 9 pages.

Keller, James L., "Alcohol as motor fuel?" Hydrocarbon Processing, May 1979, 58(5), 127-38, 12 pages.

Society of Automotive Engineers, SAE Standard J1297, "Alternative Automotive Fuels", Sep. 2002, 32 pages.

Yates, Andy et al., "Insights relating to the autoignition characteristics of alcohol fuels," Fuel 2010, 89, 83-93, Available online Jul. 19, 2009, 11 pages.

Da Silva, Rosangela et al., "Effect of additives on the antiknock properties and Reid vapor pressure of gasoline," Fuel 2005, 84, 951-959, Available online Jan. 28, 2005, 9 pages.

Da Silva, Rosangela, RON and MON values data from "Effect of additives on the antiknock properties and Reid vapor pressure of gasoline" published in Fuel in 2005.

Karonis, Dimitrios et al., "Impact of Simultaneous ETBE and Ethanol Addition on Motor Gasoline Properties," SAE Technical Paper 2008-01-2503, Powertrains, Fuels & Lubricants Meeting, Rosemont, Illinois, Oct. 6-9, 2008, 13 pages.

Ngamells, J. C. et al., "Methanol as a Motor Fuel or a Gasoline Blending Component," SAE Tech. Pap. 750123, 1975, 4 pages.

Wagner, T. O. et al., "Practicality of Alcohols as Motor Fuel," SAE Technical Paper 790429, Congress and Exposition, Cobo Hall, Detroit, Feb. 26-Mar. 2, 1979, 28 pages.

Owen, K. et al., Automotive Fuels Reference Book, 2nd ed.; Society of Automotive Engineers: Warrendale, PA, 1995, 2 pages.

Ghosh, Prasenjeet et al., "Development of a Detailed Gasoline Composition-Based Octane Model," Ind. Eng. Chem. Res. 2006, 45, 337-345, Published on web Nov. 24, 2005, 9 pages.

Van Basshuysen R. and Schafer, F., Editors, Modern Engine Technology: from A to Z, SAE International: Warrendale, PA, 2007, 3 pages.

American Petroleum Institute, "Alcohols and Ethers: A Technical Assessment of their Application as Fuels and Fuel Components", Publication 4251, 3rd ed.; Washington, DC, 2001, 4 pages.I.

American Petroleum Institute, "Determination of the Potential Property Ranges of Mid-Level Ethanol Blends: Final Report", Washington, DC, Apr. 23, 2010, 107 pages.

Yucesu, Huseyin S. et al., "Effect of ethanol-gasoline blends on engine performance and exhaust emissions in different compression ratios," Applied Thermal Engineering, 2006, 26, 2272-2278, 7 pages.

AVL, "Ethanol effects on gasoline-like HCCI combustion", Report PEI-0341 rev. 3 for Coordinating Research Council Project #AVFL-13B, 2009, 125 pages.

Forschungsvereinigung Verbrennungsmotoren (FVV), "Examination and Evaluation of Alternative Fuels for Operation in Modern Gasoline DI Engines", Project No. 942, 2009, 143 pages.

Popuri, Sriram S.S. et al., "A Performance Study of Iso-Butanol-, Methanol-, and Ethanol-Gasoline Blends Using a Single Cylinder Engine," SAE Technical Paper 932953, International Truck and Bus Meeting and Exposition, Detroit, Michigan, Nov. 1-4, 1993, 22 pages.

American Society for Testing Materials, "Knocking Characteristics of Pure Hydrocarbons", Special Technical Publication No. 225, 1958, 21 pages.

Rusin, M. H. et al., "A "Transformation" Method for Calculating the Research and Motor Octane Numbers of Gasoline Blends,". Ind. Eng. Chem. Fundam. 1981, 20, 195-204, 10 pages.

Partial Translation of Office Action of Chinese Application No. 201110220056.4, dated Aug. 11, 2015, State Intellectual Property Office of PRC, 9 Pages.

Partial Translation of Office Action of Chinese Application No. 201110220058.3, dated Sep. 21, 2015, State Intellectual Property Office of PRC, 8 Pages.

Partial Translation of Office Action of Chinese Application No. 201110220056.4, dated Feb. 2, 2015, State Intellectual Property Office of PRC, 9 pages.

\* cited by examiner

METHOD AND SYSTEM FOR CONTROLLING FUEL USAGE

CROSS REFERENCE TO RELATED APPLICATIONS

The present application is a continuation of U.S. patent application Ser. No. 12/846,730, "Method and System for Controlling Fuel Usage," filed on Jul. 29, 2010, now U.S. Pat. No. 8,554,445, the entire contents of which are hereby incorporated by reference for all purposes.

FIELD

The present application relates to methods and systems for controlling use of various fuels in an internal combustion engine.

BACKGROUND AND SUMMARY

Alternate fuels have been developed to mitigate the rising prices of conventional fuels and for reducing exhaust emissions. For example, alcohol and alcohol-containing fuel blends have been recognized as attractive alternative fuels, in particular for automotive applications. Various engine systems may be used with alcohol fuels, utilizing various engine technologies and injection technologies. Further, various approaches may be used to control such alcohol-fuelled engines to take advantage of the charge-cooling effect of the high octane alcohol fuel, in particular to address engine knocking. Engine knocking may also be controlled with other knock control fluids such as water or various water-alcohol mixtures. For example, engine control methods may include adjustment of boost or spark timing in dependence upon the knock control fluid, and various other engine operating conditions.

Engines may be configured with a charge motion control valve (CMCV) or intake manifold runner control (IMRC) valve in the air intake for adjusting an engine burn rate. By adjusting the position of the valve, the flow of air through the valve to a downstream cylinder may be selectively restricted or unrestricted. Engine control systems may be configured to coordinate the positioning of the CMCV with fuel injection based on engine operating conditions.

One example approach for CMCV control is shown by Lewis et al. in US 2007/0119422 A1. Therein, a CMCV is positioned upstream of two port injectors, the two injectors injecting fuels of differing composition into an engine cylinder. The position of the CMCV is adjusted such that the flow of air to the port injector injecting an alcohol fuel is restricted to a greater extent that the port injector injecting a gasoline fuel, under selected engine conditions. Specifically, at higher engine loads, the valve is adjusted to increase air flow and port injection of the alcohol fuel is enabled while at lower engine loads, the valve is adjusted to decrease air flow and port injection of the alcohol fuel is disabled. As such, this helps to reduce the use of spark retard at higher engine loads, while improving engine performance and fuel economy.

However, the inventors herein have recognized a potential issue with such a system. At high engine loads, adjusting the CMCV to increase the flow of air leads to a higher engine burn rate. This, along with the reduced use of spark retard at higher engine loads, can lead to very high cylinder pressures and elevated rates of pressure rise. Such elevated pressure effects can cause structural and NVH issues in the engine. In one example, it may lead to premature engine degradation.

Thus, in one example, some the above issues may be at least partly addressed by a method of operating an engine including a charge motion control valve (CMCV) comprising, at high engine loads, adjusting the CMCV to decrease an engine burn rate while increasing injection of a knock control fluid to address knock.

In one example, an engine may be configured with a CMCV in the engine air intake, upstream of a direct injector configured to inject a knock control fluid into an engine cylinder. As such, by opening the CMCV, the burn rate of the engine may be decreased, thereby reducing cylinder peak pressures and rates of pressure rise, and allowing the engine to operate at higher torque. However, the reduced engine burn rate may also increase a propensity for engine knock, in particular at higher engine loads. Thus, based on engine operating conditions, the CMCV may be opened to reduce an engine burn rate, while an amount of knock control fluid injected may be concomitantly increased to address the knock. In this way, engine performance may be improved.

An engine controller may be configured to adjust whether the CMCV is opened based on the availability of the knock control fluid. Specifically, if knock control fluid is not available, then the CMCV may be closed to increase burn rate and avoid knock, but the engine maximum torque may be limited (e.g. by limiting boost), to avoid high peak cylinder pressure and/or high rate of pressure rise. Conversely, if knock control fluid is available then the CMCV may be opened and the torque limit of the engine may be increased, as the availability of the knock control fluid increases. For example, based on engine operating conditions, a feed-forward likelihood of knock, as well as an amount of knock control fluid required to address the knock may be determined. It may be further determined whether the required amount of knock control fluid is available, for example, as inferred from a fluid level sensor.

In one example, when the amount of knock control fluid available is greater than a threshold (the threshold based on the amount of fluid required to address a feed-forward likelihood of knock), the CMCV may be opened, while increasing injection of the knock control fluid. Herein, by opening the CMCV the burn rate may be decreased to improve engine NVH and reduce engine structural loads. At the same time, the higher likelihood of knock that may result from the lower burn rate may be advantageously addressed with the direct injection of the knock control fluid.

In another example, when the amount of knock control fluid is lower than the threshold, the CMCV may be closed, while adjusting an engine operating parameter, such as boost, to reduce the engine output thereby reducing the likelihood of knock. For example, while the CMCV is closed, engine boost, spark timing, VCT, and/or throttle adjustments may be performed to reduce the likelihood of knock and to keep cylinder pressure within a desired limit (such as, below a structural limit), and further to keep a rate of rise in cylinder pressure within a desired range (such as, below an NVH limit). Additionally, a smaller amount of knock control fluid may be injected. Alternatively, when sufficient knock control fluid is not available, the CMCV may be kept closed, to increase the engine burn rate and address knock with the higher burn rate, and torque adjustments may be made using an alternate engine operating parameter, such as boost, VCT, or spark timing.

The knock control fluid direct injected into the cylinder may include one or more of ethanol, methanol, other alcohols, gasoline, water, and combinations thereof. The amount of fluid direct injected may be based on the composition of the injected fluid. For example, the amount may be adjusted based on the molar composition of the injected fluid. Thus, as a molar ratio of alcohol in the injected fluid increases, the amount of fluid injected may be decreased. The amount may also be adjusted based on a combination of an inherent octane effect, a dilution effect, and an evaporation effect of the injected fluid.

In this way, at high engine loads, a CMCV may be opened to decrease an engine burn rate, and improve engine performance, while increasing the injection of a knock control fluid to address knock arising from the decreased engine burn rate. Additionally, a predetermined amount of spark retard may be maintained. By adjusting whether the CMCV is opened and the engine burn rate is slowed based on the availability of an amount of knock control fluid for addressing the knock at the reduced engine burn rate, engine performance may be improved, in particular at higher engine loads.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
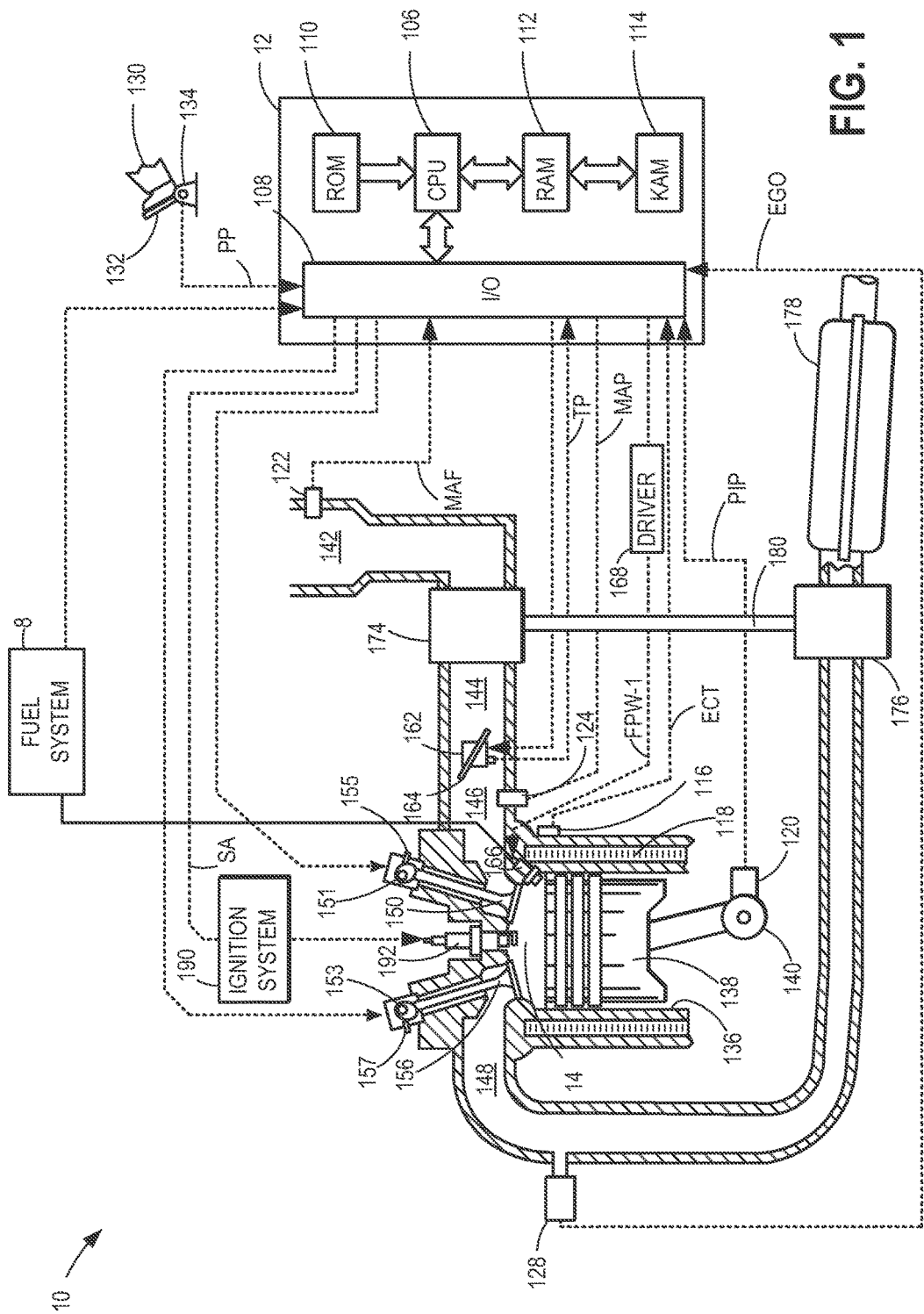
FIG. 1 shows an example embodiment of an engine combustion chamber.
Figure 2:
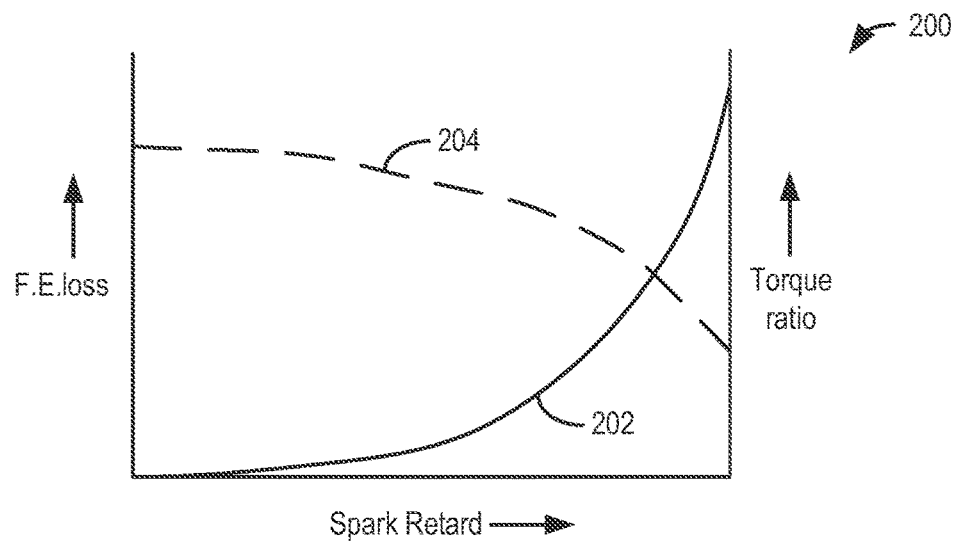
FIG. 2 shows a map depicting variations in fuel economy loss and torque ratio with varying spark retard.
Figure 9:
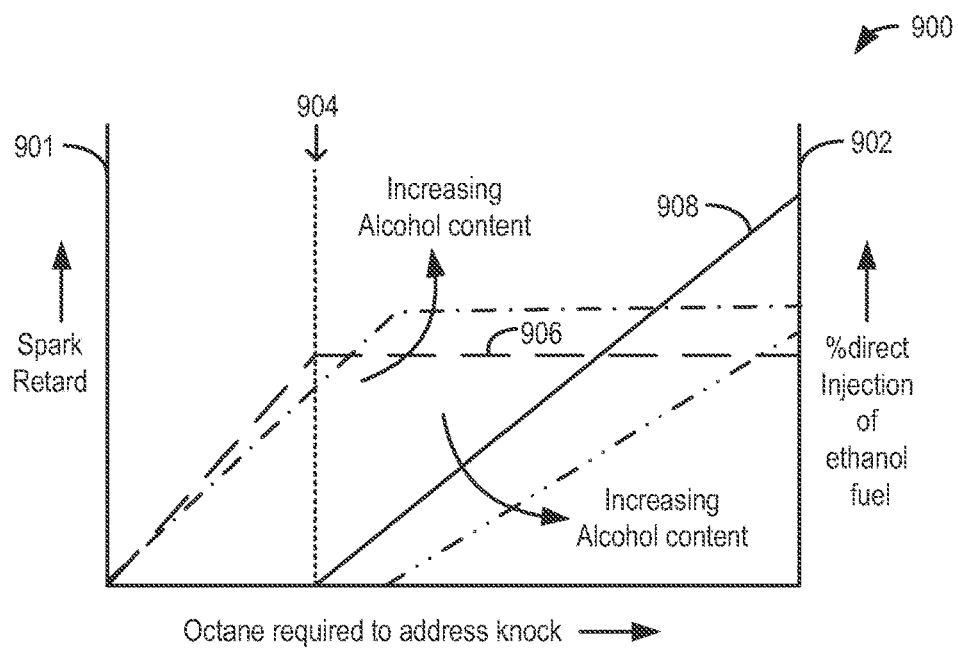
FIG. 9 shows a map illustrating an example usage of spark retard and direct injection of an ethanol fuel to address knock, according to the present disclosure.
Figure 6:
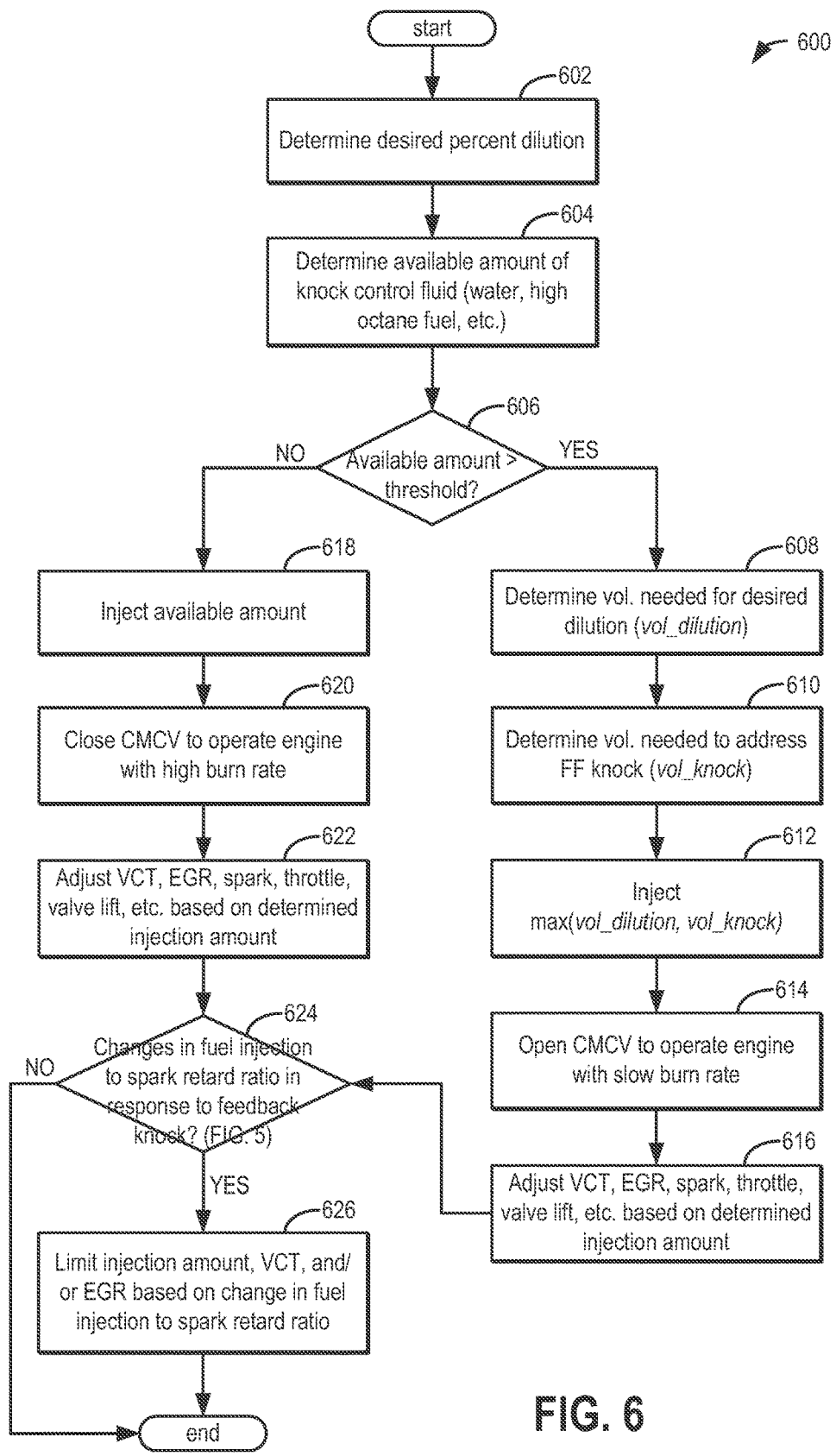
FIG. 6 shows a high level flow chart for adjusting an engine dilution and engine burn rate based on the availability of a knock control fluid.
Figure 7:
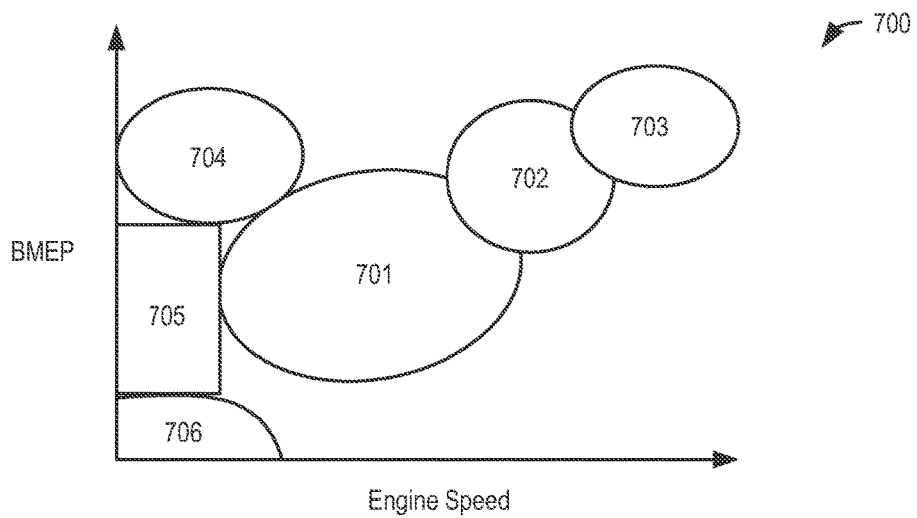
FIG. 7 shows a map that may be used to adjust the threshold point for usage of spark retard and a high octane fuel injection based on engine speed-load conditions.
Figure 12:
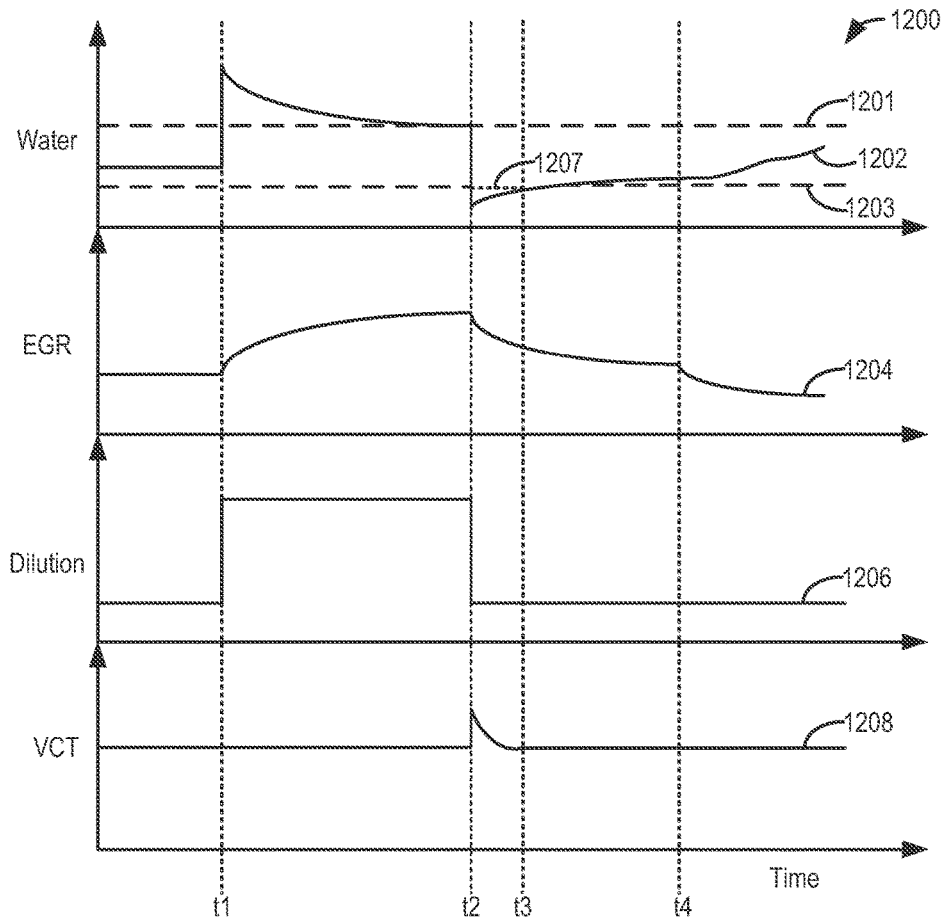
FIG. 12 shows a map illustrating example changes in a direct injection of water responsive to EGR transients.
Figure 8:
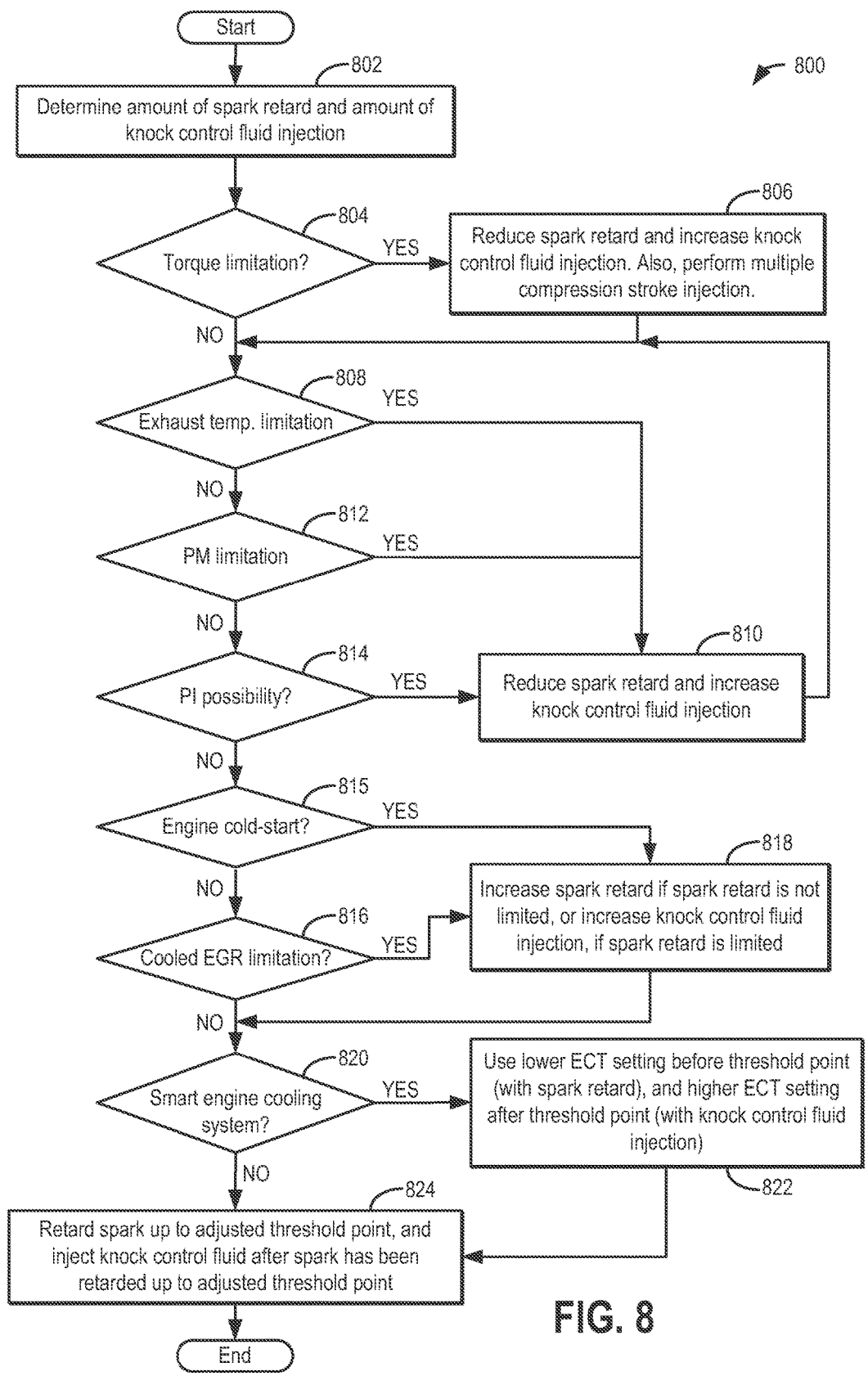
FIG. 8 shows a high level flow chart illustrating a routine that may be implemented for adjusting the threshold point for usage of spark retard and high octane fuel injection based on various engine operating condition limitations.
Figure 10:
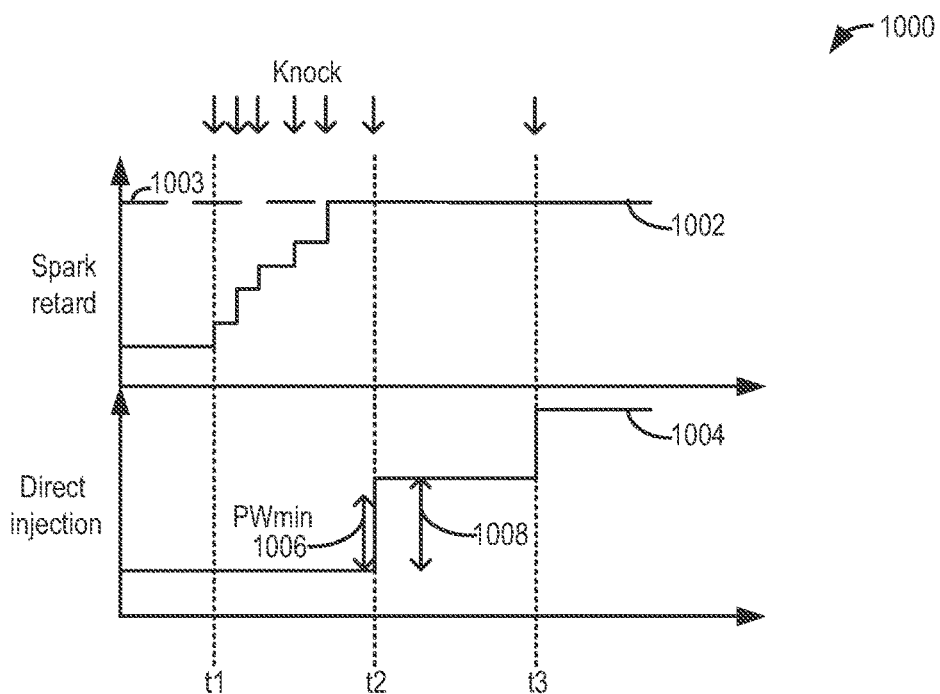
FIGS. 10-11 show maps illustrating example adjustments to the usage of spark retard and direct injection of a knock control fluid based on the amount of fuel injected.
Figure 11:
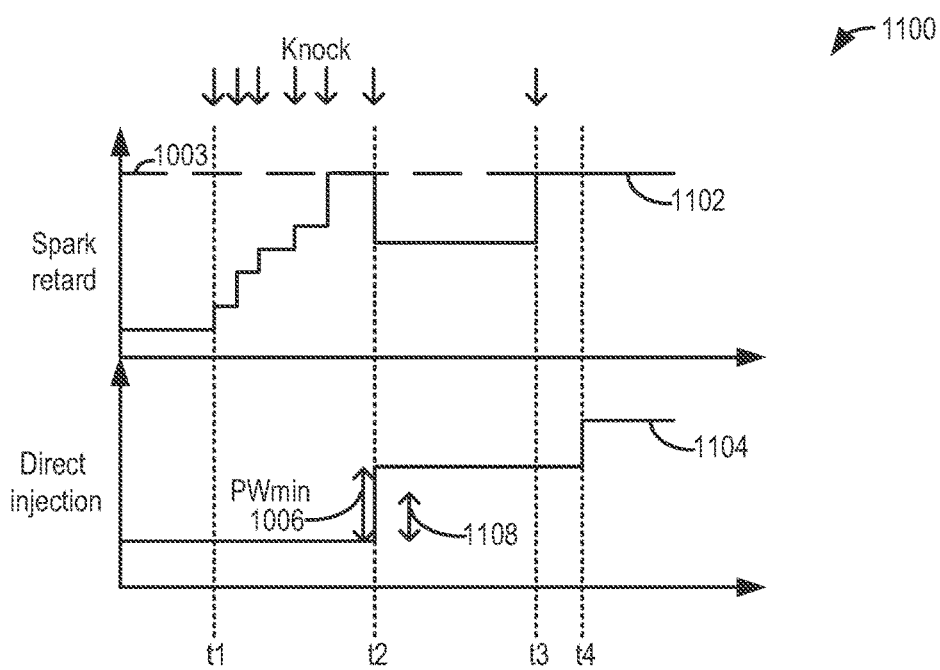
Figure 13:
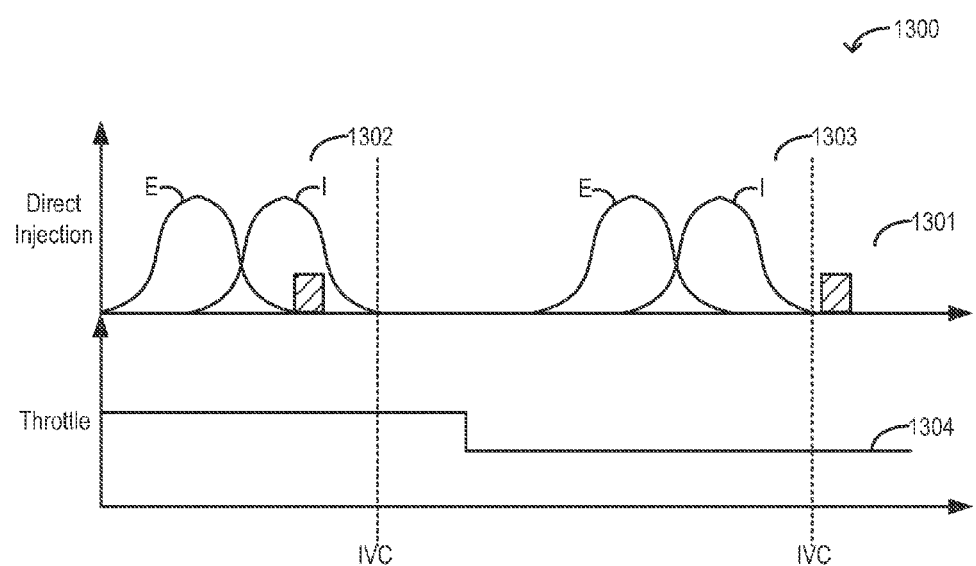
FIG. 13 shows a map illustrating example throttle adjustments responsive to a timing (relative to IVC) of the direct injection of water.

The following description relates to systems and methods for improving the efficiency of fuel usage in flex-fueled engines, such as the engine of FIG. 1. In response to engine knocking, an amount of spark retard and a knock control fluid injection may be used to address the knock. Specifically, spark may be retarded up to a predetermined amount of retard (such as a predetermined timing, or threshold point), up to which it may be more advantageous (e.g., more fuel economical) to use spark retard, and beyond which it may be more advantageous to inject a knock control fluid to address engine knock. As shown in FIGS. 2-5, based on a driver-selected cost function, a controller may adjust usage of spark retard and usage of direct injected and/or port injected fuels, or knock control fluids, to address knock. The usage may be further based on a combination of the inherent octane content, dilution effect, and charge cooling effect of the available knock control fluid(s), for example, as inferred from a composition (e.g., molar or volumetric) of the injected knock control fluid. As shown in FIGS. 7-8, at selected engine operating conditions (such as speed-load conditions), engine limitations (such as torque, temperature, and emissions limitations) may be determined, and the predetermined timing may be further adjusted accordingly. As shown in FIG. 9, in response to knocking, the controller may use spark retard up to the predetermined timing to address the knock, after which, the controller may use the injection of a knock control fluid to address knock. As shown in FIGS. 10-11, the adjustments between use of spark retard and knock control fluid injection may also be based on the amount of the injected knock control fluid, as compared to pulse width injection limitations of the injector. As shown in FIGS. 6 and 12, additional engine adjustments may be performed based on the dilution effect of the injected knock control fluid so as to better coordinate the engine dilution advantages and knock suppressing advantages of the injected fluid. Further, as shown in FIG. 13, throttle adjustments may be made based on a timing of the direct injection relative to intake valve closing, so as to better compensate for torque transients. In this way, by improving the use of spark retard and injection of fuel or knock control fluid in addressing knock, knock control fluid may be used more judiciously while engine performance is improved.

FIG. 1 depicts an example embodiment of a combustion chamber or cylinder of internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 may communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 1, or alternatively may be provided upstream of compressor 174.

Exhaust passage 148 may receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be measured by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The operation of intake valve 150 and exhaust valve 156 may be determined by valve position sensors (not shown) and/or camshaft position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system. As elaborated with reference to FIGS. 6 and 12, a cam timing may be adjusted (by advancing or retarding the VCT system) to adjust an engine dilution in coordination with an EGR flow and/or a direct injection of a knock control fluid, thereby reducing EGR transients and improving engine performance.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more injectors for providing a knock control fluid thereto. In some embodiments, the knock control fluid may be a fuel, wherein the injector is also referred to as a fuel injector. As a non-limiting example, cylinder 14 is shown including one fuel injector 166. Fuel injector 166 is shown coupled directly to cylinder 14 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 14. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 14.

It will also be appreciated that while in one embodiment, the engine may be operated by injecting the variable fuel or knock control fluid blend via a single direct injector; in alternate embodiments, the engine may be operated by using two injectors (a direct injector 166 and a port injector) and varying a relative amount of injection from each injector.

Fuel may be delivered by the injector to the cylinder during a single cycle of the cylinder. Further, the distribution and/or relative amount of fuel or knock control fluid delivered from the injector may vary with operating conditions, such as aircharge temperature, as described herein below. Furthermore, for a single combustion event, multiple injections of the delivered fuel may be performed per cycle. The multiple injections may be performed during the compression stroke, intake stroke, or any appropriate combination thereof.

As described above, FIG. 1 shows only one cylinder of a multi-cylinder engine. As such each cylinder may similarly include its own set of intake/exhaust valves, fuel injector(s), spark plug, etc.

Fuel tanks in fuel system 8 may hold fuel or knock control fluids with different qualities, such as different compositions. These differences may include different alcohol content, different water content, different octane, different heat of vaporizations, different fuel blends, different water contents, and/or combinations thereof etc. In one example, knock control fluids with different alcohol contents could include one fuel being gasoline and the other being ethanol or methanol. In another example, the engine may use gasoline as a first substance and an alcohol containing fuel blend such as E85 (which is approximately 85% ethanol and 15% gasoline) or M85 (which is approximately 85% methanol and 15% gasoline) as a second substance. Other alcohol containing fuels could be a mixture of alcohol and water, a mixture of alcohol, water and gasoline etc. In still another example, both fuels may be alcohol blends wherein the first fuel may be a gasoline alcohol blend with a lower ratio of alcohol than a gasoline alcohol blend of a second fuel with a greater ratio of alcohol, such as E10 (which is approximately 10% ethanol) as a first fuel and E85 (which is approximately 85% ethanol) as a second fuel. Additionally, the first and second fuels may also differ in other fuel qualities such as a difference in temperature, viscosity, octane number, latent enthalpy of vaporization etc.

Moreover, fuel characteristics of the fuel or knock control fluid stored in the fuel tank may vary frequently. In one example, a driver may refill the fuel tank with E85 one day, and E10 the next, and E50 the next. The day to day variations in tank refilling can thus result in frequently varying fuel compositions, thereby affecting the fuel composition delivered by injector 166.

While not shown, it will be appreciated that engine may further include one or more exhaust gas recirculation passages for diverting at least a portion of exhaust gas from the engine exhaust to the engine intake. As such, by recirculating some exhaust gas, an engine dilution may be affected which may improve engine performance by reducing engine knock, peak cylinder combustion temperatures and pressures, throttling losses, and NOx emissions. The one or more EGR passages may include an LP-EGR passage coupled between the engine intake upstream of the turbocharger compressor and the engine exhaust downstream of the turbine, and configured to provide low pressure (LP) EGR. The one or more EGR passages may further include an HP-EGR passage coupled between the engine intake downstream of the compressor and the engine exhaust upstream of the turbine, and configured to provide high pressure (HP) EGR. In one example, an HP-EGR flow may be provided under conditions such as the absence of boost provided by the turbocharger, while an LP-EGR flow may be provided during conditions such as in the presence of turbocharger boost and/or when an exhaust gas temperature is above a threshold. The LP-EGR flow through the LP-EGR passage may be adjusted via an LP-EGR valve while the HP-EGR flow through the HP-EGR passage may be adjusted via an HP-EGR valve (not shown).

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and manifold absolute pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Still other sensors may include fuel level sensors and fuel composition sensors coupled to the fuel tank(s) of the fuel system.

Storage medium read-only memory 110 can be programmed with computer readable data representing instructions executable by processor 106 for performing the methods described below as well as other variants that are anticipated but not specifically listed.

During selected engine operating conditions, such as at low engine speeds and under high load conditions, engine knocking may occur. In one example, engine knocking may be addressed by retarding the ignition spark timing, herein also referred to as spark retard. By retarding the ignition spark timing from MBT, cylinder peak pressure and temperature may be reduced, thereby reducing the occurrence of knock. However, retarding spark from MBT also reduces engine thermal efficiency and torque output. Consequently, to meet the driver requested torque when spark is retarded, air and fuel flow may be increased to compensate for the torque loss. Thus, the additional air and fuel compensation result in reduced fuel economy. The resultant fuel economy penalty, $SPARK_{FE\_LOSS}$, may be computed as follows, $$SPARK_{FE\_LOSS} = \frac{1}{TR} - 1 \qquad (1)$$

where TR is the torque ratio. The change in fuel economy loss is illustrated in map 200 of FIG. 2 by curve 202. As shown by curve 204, the torque ratio is highest when spark is at MBT, but decreases as the spark is retarded.

Instead of retarding spark, engine knock may be addressed by injecting a knock control fluid into the cylinder. The knock control fluid may be a fuel with a high effective octane content, such as an ethanol fuel. As such, the effective octane content of an injected fuel may be composed of various components representing various knock mitigating characteristics of the fuel, such as a combination of the inherent octane of the fluid, a dilution effect of the fluid, and an evaporation effect of the fluid. Thus, for example, an ethanol fuel blend (such as E85) may be directly injected into the cylinder to take advantage of the inherently high octane number of the fuel (inherent fuel octane component), and the charge cooling effect of the ethanol fuel (evaporative octane component). However, due to the smaller heat of combustion (lower heating value, LHV) of ethanol as compared to gasoline, a larger volume of fuel may have to be combusted to achieve the same energy output. Consequently, there is a reduction in volumetric fuel economy (miles per gallon), despite the improved thermal efficiency from operating closer to MBT spark timing. The resultant fuel economy penalty, $ETHF_{FE\_LOSS}$, may be computed as follows, $$ETH_{FE\_LOSS} = E.D.\left(1 - \frac{\rho_{ETH}, LHV_{ETH}}{\rho_{GAS}, LHV_{GAS}}\right) \quad (2)$$

where E is the mass percentage ethanol content in the directly injected fuel, D is the mass percentage of directly injected fuel required to mitigate knock, $LHV_{ETH}$ and $LHV_{GAS}$ are the lower heating values of the fuels, and $\rho_{ETH}$ and $\rho_{GAS}$ are the densities of the fuels.

Under knock conditions, a controller may determine whether to retard spark by a required amount and accept the thermal efficiency and fuel economy loss associated with that amount of spark retard, or whether to leave spark at MBT and direct inject a required amount of knock control fluid (such as, the injection of an ethanol fuel) and accept the volumetric fuel economy loss associated with the ethanol injection. For example, an engine controller may be configured to compare the fuel economy penalties from the direct injection of an ethanol fuel (such as E85) with the fuel economy penalty from spark retard as follows:

$$SPARK_{FE\_LOSS} - ETH_{FE\_LOSS} \quad (3)$$

Figure 3:
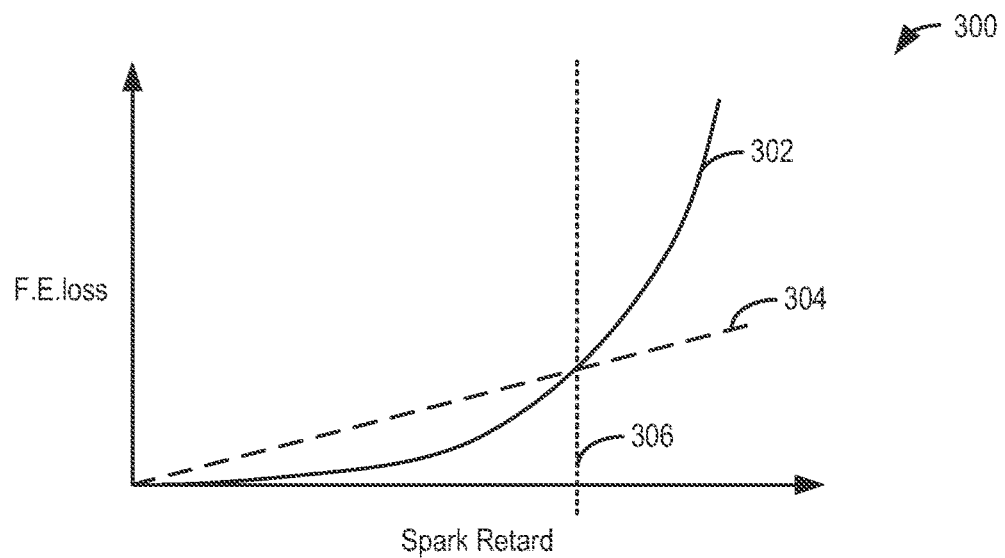
FIG. 3 shows a map that may be used to identify an adjustment threshold point by comparing fuel economy losses due to spark retard with fuel economy losses due to an ethanol fuel injection.

In one example, a map such as map 300 of FIG. 3 may be employed to compare the fuel economy loss from retarding spark (curve 302) with the fuel economy loss from the ethanol injection (curve 304). Based upon the comparison, a timing, or threshold point 306, may be determined. As such, threshold point 306 (herein also referred to as break-even point or switch point) may represent a predetermined amount of retard, or predetermined timing (such as, in crank angles degrees or degrees of spark retard) after which increasing injection of the ethanol fuel may provide a fuel economy advantage over retarding spark, and before which retarding spark may provide a fuel economy advantage over increasing injection of the ethanol fuel, when addressing engine knock. Thus, in response to engine knock, an engine controller may first retard ignition spark timing up to the predetermined amount of retard. After the ignition spark timing reaches the predetermined timing, the controller may increase an amount of knock control fluid (or fuel) directly injected in to the cylinder to suppress the engine knock, while maintaining the spark timing at the predetermined amount of retard (that is, at the predetermined timing). That is, use of spark retard and increasing direct injection of a knock control fluid may be switched at this point.

As such, the predetermined timing may be based on engine operating conditions (such as an engine speed and load condition) and further based on an operator selected cost function. As elaborated above, these selected cost functions may include at least one of fuel economy, $CO_2$ emissions, and price effectiveness.

The predetermined timing may be further adjusted based on the effective octane content of the injected fuel. As such, the injected knock control fluid may include one or more of gasoline, ethanol, methanol, windshield wiper fluid, other alcohols, water, and combinations thereof. In one example, where the direct injected fuel is an ethanol fuel blend, the effective octane content of the injected fluid may be based on the alcohol content of the fuel, and thus the threshold point may vary based on the alcohol content of the fluid. For example, the predetermined timing may be retarded from MBT as the alcohol content of the injected fuel increases. Thus, an ethanol fuel blend with a lower amount of ethanol (such as E10, which has approximately 10% ethanol) may have a lower threshold point (that is, a relatively lower amount of retard) than an ethanol fuel blend with a larger amount of ethanol (such as E85, which has approximately 85% ethanol).

In one example, where the ethanol fuel is E85, and the selected cost function is volumetric fuel economy (miles per gallon), the predetermined timing (306) may be 11 degrees of spark retard. Herein, during knocking conditions, as the octane requirement to address knocking increases, spark retard may be employed up to 11 degrees of spark retard since the thermal efficiency loss associated with the spark retard is lower than the volumetric fuel economy loss associated with E85 up to this point. However, after spark has been retarded up to 11 degrees of spark retard, increasing injection of E85 may provide lower fuel economy loss than spark retard. Consequently, to address further knocking, spark ignition timing may be held at 11 degrees retarded from MBT while an amount of E85 injected is increased to fulfill the knock addressing requirement.

While the above example uses volumetric fuel economy as the cost function in determining the predetermined amount of retard for addressing engine knock, it will be appreciated that in alternate examples, other cost functions may be used. Alternate cost functions may include, for example, exhaust emissions (such as, $CO_2$ emissions) and price effectiveness (such as, cost of operation in miles per dollar). In one example, where the cost function is price effectiveness, fuel prices of the injected fluid may be taken into consideration. Thus, a cost loss resulting from an ethanol fuel injection, $ETH_{DOLLAR\_LOSS}$, may be computed as follows, $$ETH_{DOLLAR\_LOSS} = E.D.\left(1 - \frac{\rho_{ETH}, LHV_{ETH}, \$_{GAS}}{\rho_{GAS}, LHV_{GAS}, \$_{ETH}}\right) \quad (4)$$

where $\$_{GAS}$ and $\$_{ETH}$ are the fuel prices per unit volume, $LHV_{ETH}$ and $LHV_{GAS}$ are the lower heating values for the fuels, and $\rho_{ETH}$ and $\rho_{GAS}$ are the densities for the fuels.

In another example, where the cost function is $CO_2$ emissions, $CO_2$ losses resulting from an ethanol fuel injection, $ETH_{CO2\_LOSS}$, may be computed as follows, $$ETH_{CO_2\_LOSS} = \left(1 - \frac{C_{GAS}}{EC_{ETH}}\right) \quad (5)$$

where $C_{GAS}$ and $C_{ETH}$ are the amounts of $CO_2$ produced by each fuel in kg of $CO_2$ produced per GJ of energy released by the fuel. This $CO_2$ cost function can be calculated in various ways, for example as tailpipe total $CO_2$ emissions, tailpipe fossil-derived $CO_2$ emissions, or full fuel life-cycle (well-to-wheels) $CO_2$ emissions.

Thus, based on the driver-selected cost function, in response to engine knocking, an engine controller may determine whether to use spark retard or knock control fluid injection (for example, of an ethanol fuel) upon comparing the cost function loss related to the spark retard with the ethanol direct injection. That is, when the cost function is price effectiveness, a threshold point may be determined as follows:

$$SPARK_{DOLLAR\_LOSS} - ETH_{DOLLAR\_LOSS} \quad (6)$$

Similarly, when the cost function is $CO_2$ emissions, a threshold point may be determined as follows:

$$SPARK_{CO2\_LOSS} - ETH_{CO2\_LOSS} \quad (7)$$

Generalized, the cost function loss comparison may be determined as follows:

$$SPARK_{COSTFN\_LOSS} - ETH_{COSTFN\_LOSS} \quad (8)$$

Figure 4:
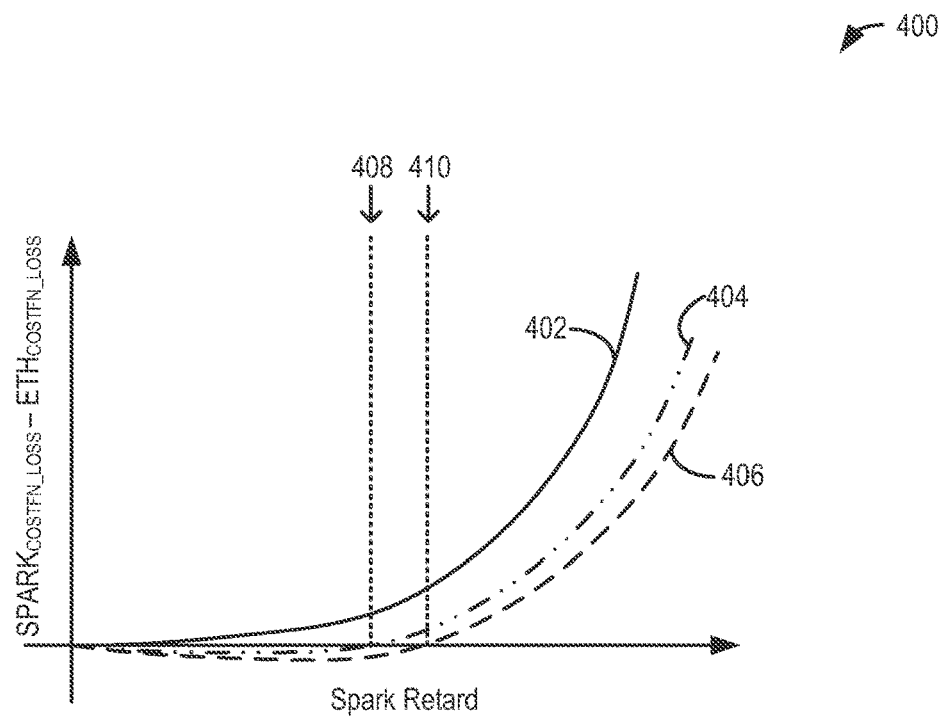
FIG. 4 shows a map comparing losses due to spark retard with losses due to an ethanol fuel injection for various cost functions.

FIG. 4 shows a map 400 of curves generated from expressions (3), (6), (7) and (8). Specifically, map 400 depicts spark retard from MBT on the x-axis and cost function loss comparisons (that is, a difference between loss due to spark retard and loss due to ethanol fuel injection for the selected cost function, in percentage) on the y-axis. Curve 406 (dashed line) depicts a comparison of losses when the cost function is volumetric fuel economy, curve 404 (dashed and dotted line) depicts a comparison of losses when the cost function is $CO_2$ emission, and curve 402 (solid line) depicts a comparison of losses when the cost function is price effectiveness.

In each case, a corresponding predetermined amount of retard or predetermined timing (or threshold point) may be determined where the curve crosses zero. Thus, in the case of curve 404, the threshold point occurs at 408, while for curve 406, the threshold point occurs at 410, wherein below the threshold point, it may be more advantageous to retard spark, while above the threshold point, it may be more advantageous to hold spark retard and increase injection of the ethanol fuel. In the case that a curve is always above zero, for example as shown with reference to curve 402, it may always be more advantageous to direct inject the ethanol fuel in lieu of retarding spark.

While the examples of FIGS. 3-4 are depicted with reference to a direct injection of the ethanol fuel E85, it will be appreciated that this is not meant in a limiting sense, and that in alternate examples, other knock control fluids may be used. These may include, for example, various alcohol fuel blends with higher or lower alcohol content or fluids or fuel blends with different inherent octane, dilution, or evaporation properties, CNG (compressed natural gas), water, methanol, washer fluid (which is a mixture of approximately 60% water and 40% methanol), etc.

As such, in addition to the predetermined amount of retard, an amount of knock control fluid direct injected into a cylinder to address knock may also be adjusted based on the effective octane content of the injected fluid (or fuel). For example, the adjustment may include decreasing an amount of knock control fluid direct injected as the effective octane content of the fluid increases. As previously mentioned, the effective octane content of a given fluid may be a combination of the fluid's inherent octane content (or octane number), a dilution effect of the fluid (based on the inert content of the fluid, such as water), and an evaporation effect of the fluid (based on the heat of vaporization of the fluid). In one example, where the injected fluid is CNG, the effective octane content of the fuel may be based on the CNG fuel's octane number only since CNG may have substantially no charge cooling effect (that is, no evaporative octane component), or dilution effect (that is, no inert component). In another example, where the injected fluid is an ethanol fuel blend, the effective octane content of the fuel may be based on the fuel's inherent octane component as well as an evaporative octane component, due to the charge cooling effect of ethanol, but there may be no dilution effect octane component. In still another example, where the injected fluid is water, the effective octane content of the fluid may be based on the dilution effect and charge cooling effect of water only. In one example, the octane content of the injected fluid may be based on the molar composition of the fluid. Thus, the predetermined timing and amount of fuel direct injected may be adjusted based on the molar composition of the injected fuel. However, in an alternate example, the octane content of the injected fluid may be based on the volumetric composition of the fluid.

The inherent octane component of a fuel may be rated in terms of a research octane number (RON) and/or a motor octane number (MON). In the case of fuel blends, small molecular weight alcohols, such as ethanol and methanol (which have higher RON and MON values) are added to gasoline to improve the RON value of the gasoline fuel. The addition of even a small amount of alcohol (for example, 10% by volume) can result in a large, and non-linear, increase in the RON value of the blended fuel, making a determination of the change in RON value for the gasoline fuel due to the addition of the alcohol complex. In some cases, a "blending RON (bRON)" value may be used to describe the effects of the addition of small amounts of alcohol to gasoline in blended fuels. The bRON value may be calculated based on the volumetric composition of alcohol and gasoline in the blend as follows:

$$RON_{blend} = (1-X_{v,alc}) \cdot RON_{base} + (X_{v,alc}) \cdot bRON_{v,alc} \quad (9)$$

where $X_{v,alc}$ is the volume fraction of alcohol in the fuel blend, $RON_{blend}$ is the RON of the alcohol-gasoline fuel blend, $RON_{base}$ is the RON of the base gasoline, and $bRON_{v,alc}$ is the blending RON of alcohol in base gasoline based on volumetric content. However, since the bRON value depends on the concentration of alcohol added to the base gasoline, the RON of the base gasoline, and the hydrocarbon composition of the base gasoline, there may be no single bRON value for a given alcohol, thereby limiting the utility of the bRON approach.

In another approach, the inherent octane component of a blended fuel may be calculated based on the molar composition of the fuel. In comparison with the volumetric composition approach which is based on the volume of alcohol and gasoline the fuel blend in the liquid state (that is, as it is prepared and typically measured), the molar composition reflects the number of molecules of alcohol and gasoline in the blend. As such, the molar composition may be more relevant to describing the gas-phase chemical reactions that occur with the vaporized fuel in the engine cylinder. Further, in the gaseous state, the volumetric composition may be approximately equal to the molar composition. The molar composition of a fuel blend may be calculated similar to the volumetric composition (as described in equation 9) except that the alcohol content is calculated on a molar basis (as described below in equation 10) using the density and molecular weight of the alcohol (that is, known physical properties of the alcohol) and the density and average molecular weight of the gasoline (as measured or estimated). Since the density and molecular weight of gasoline do not have much variance for commercial gasoline, estimated values may be sufficiently accurate for such calculations. Thus, the bRON value for a fuel blend may be calculated based on the molar composition of alcohol and gasoline in the blend as follows:

$$RON_{blend} = (1 - X_{m,alc}) . RON_{base} + (X_{m,alc}) . bRON_{v,alc} \quad (10)$$

$$X_{m,alc} = \frac{X_{v,alc}}{X_{v,alc} + (1 - X_{v,alc}) \frac{\rho_{base} MW_{alc}}{\rho_{alc} MW_{base}}} \quad (11)$$

where $X_{m,alc}$ is the molar fraction of alcohol in the fuel blend, $RON_{blend}$ is the RON of the alcohol-gasoline fuel blend, $MW_{base}$ is the average molecular weight of the base gasoline, $MW_{alc}$ is the molecular weight of the alcohol, $\rho_{base}$ is the density of the base gasoline, $\rho_{alc}$ is the density of the alcohol, and $bRON_{m,alc}$ is the blending RON of alcohol in base gasoline based on molar content. It will be appreciated that while equations (9)-(11) are shown in the context of blending RON values, the same may be applied for RON and MON values. As such, a RON value calculated based on the molar composition of a blended fuel may display a substantially linear relationship with alcohol content of the fuel. Consequently, blending RON values calculated on a molar basis may show little to no dependence on alcohol concentration in the fuel, or on the RON of the base gasoline. Additionally, there may be considerably less variation in the molar blending RON value of a blended fuel as compared to its volumetric blending RON value. Further, the resulting molar blending RON value of an ethanol-gasoline fuel blend may be substantially equal to the blending RON value for pure ethanol, while the molar blending RON value of a methanol-gasoline fuel blend may be substantially equal to the blending RON value for pure methanol.

A simplified formulation for estimating RON, or MON, for alcohol addition to a gasoline composition may be determined as follows:

$$RON_{blend} = (1 - X_{m,alc}) \cdot RON_{base} + (X_{m,alc}) \cdot RON_{alc} \quad (12)$$

$$X_{m,alc} = \frac{X_{v,alc}}{1 + R_{ga}(1/X_{v,alc} - 1)} \quad (13)$$

where $X_{m,alc}$ is the molar fraction of alcohol in the fuel blend, $X_{v,alc}$ is the volume fraction of alcohol in the fuel blend, $RON_{blend}$ is the RON of the alcohol-gasoline fuel blend, $RON_{base}$ is the RON of the base gasoline, $RON_{alc}$ is the RON of the pure alcohol (e.g., 109 for ethanol and methanol), and $R_{ga}$ is the alcohol-specific liquid molar volume ratio which incorporates the molecular weights and densities of the alcohol and typical gasoline (e.g., 0.400 for ethanol or 0.275 for methanol). Alternatively, equations (12) and (13) may be combined as follows:

$$RON_{blend} = \left[1 - \frac{1}{1 + R_{ga}(1/X_{v,alc} - 1)}\right] \cdot RON_{base} + \left[1 - \frac{X_{v,alc}}{1 + R_{ga}(1/X_{v,alc} - 1)}\right] \cdot RON_{alc} \quad (14)$$

Thus, in one example, such an approach may be used to determine the inherent octane component (and consequently the effective octane content) of a blended fuel more accurately and reliably, which in turn may be used to determine the predetermined amount of retard, or predetermined timing (or threshold point) for usage of spark retard and increasing direct fuel injection when addressing knock. For example, based on engine operating conditions, a feed-forward likelihood of knock and a RON required to address the knock may be determined. The blending calculation may then be used to determine an amount of direct injected knock control fluid or fuel (for example, ethanol) that may be required to meet the RON requirement. In another example, in a flex-fuel vehicle operating with an ethanol blended fuel, an amount of ethanol in the blended fuel may be estimated from the feedback of an oxygen sensor (such as, an air fuel ratio estimating oxygen sensor). This, in turn, may be used to predict the RON of the fuel and determine the threshold point for spark control and fuel injection. The same may also be used as feed-forward information to allow adaptation of a spark control strategy after a refueling event, but before knock sensor feedback is used. As such, by adjusting the amount of knock control fluid or fuel direct injected and the predetermined timing or threshold point based on the molar composition of the injected fluid (for example, using the blended RON octane number of the fuel as determined by a molar approach), calculations of octane benefit from alcohol fuel injection may be linearized and simplified. However, in alternate embodiments, the calculations may be based on the volumetric composition of the injected fluid.

In some engines, the fluid injected to address knock may also be one of a second fluid coupled to a second, auxiliary fluid tank. Example second knock control fluids may include water, methanol, ethanol, higher octane gasoline, washer fluid, or combinations thereof. In one example, where the injected fluid is water, the effective octane content of the fluid may include an evaporative octane component and a dilution effect octane component only. In another example, where the direct injected fluid is washer fluid, the effective octane content of the fuel may include an inherent fuel octane component, an evaporative octane component, as well as a dilution effect octane component. In still other examples wherein EGR is used, only a dilution effect octane component may be included.

As such, to increase the charge cooling effect of the injected knock control fluid, a direct injection of the fluid may be performed in response to knocking. Herein, by direct injecting a knock control fluid into the cylinder, the evaporative cooling of the fluid is enhanced and the effective octane number of the fluid injected into the cylinder may be rapidly increased, thereby reducing the knock limit. Based on the amount of knock control fluid direct injected into the cylinder, an amount of fuel that is port injected may be adjusted such that the total amount of fuel delivered via the fuel injectors satisfies the stoichiometric requirements.

The octane number required to address knock $Oct_{req}$, may be computed as follows, $$Oct_{req} = X \cdot Oct_{DI} + (1-X) \cdot Oct_{PFI} \quad (15)$$

where X is the fraction of knock control fluid direct injected and (1–X) is the fraction of fuel port injected, $Oct_{DI}$ is the effective octane of the knock control fluid delivered through the direct injectors, and $Oct_{PFI}$ is the effective octane of the knock control fluid delivered through the port injectors. Equation (15) may be solved for X to determine the minimum fraction of direct injected knock control fluid that may be required to address knock, as follows:

$$X = \frac{Oct_{req} - Oct_{PFI}}{Oct_{DI} - Oct_{PFI}} \quad (16)$$

As previously elaborated, the effective octane content (or number) of a knock control fluid delivered through a direct injector and/or a port injector may be determined as a combination of the multiple octane components or effects, as follows:

$$Oct_{DI} = Oct_{DI,INH} + Oct_{DI,EVAP} + Oct_{DI,DIL}$$

and $$Oct_{PFI} = Oct_{PFI,INH} + Oct_{PFI,EVAP} + Oct_{PFI,DIL}$$

where $Oct_{INH}$, $Oct_{EVAP}$, and $Oct_{DIL}$ are the inherent, evaporative, and dilution effect octane components for the direct injected (DI prefixed) or port injected (PFI prefixed) knock control fluids or fuels, and further wherein, $$Oct_{DI,INH} = A_{DI,INH}(E_{DI}) + B_{DI,INH},$$

$$Oct_{DI,EVAP} = A_{DI,EVAP}(E_{DI}) + B_{DI,EVAP},$$

$$Oct_{DI,DIL} = A_{DI,DIL}(E_{DI}) + B_{DI,DIL},$$

$$Oct_{PFI,INH} = A_{PFI,INH}(E_{PFI}) + B_{PFI,INH},$$

$$Oct_{PFI,EVAP} = A_{PFI,EVAP}(E_{PFI}) + B_{PFI,EVAP}, \text{ and}$$

$$Oct_{DI,DIL} = A_{PFI,DIL}(E_{PFI}) + B_{PFI,DIL},$$

where A and B are calibratable constants, $E_{DI}$ is the % mass ethanol content in the direct injected fuel system, and $E_{PFI}$ is the % mass ethanol content in the port injected fuel system. By computing the effective octane content of each fluid, and by solving equations (15) and (16) using those values, the ratio of fluid direct injected and port injection to address knock may be determined.

In this way, by retarding ignition spark timing up to a predetermined amount of retard, and increasing an amount of knock control fluid directly injected to suppress the engine knock after the ignition spark timing reaches the predetermined amount of retard, while maintaining the spark timing at the predetermined amount of retard, or predetermined timing, the amount of knock control fluid used to mitigate knock may be reduced while the volumetric fuel economy and range of a vehicle may be increased.

Figure 5A:
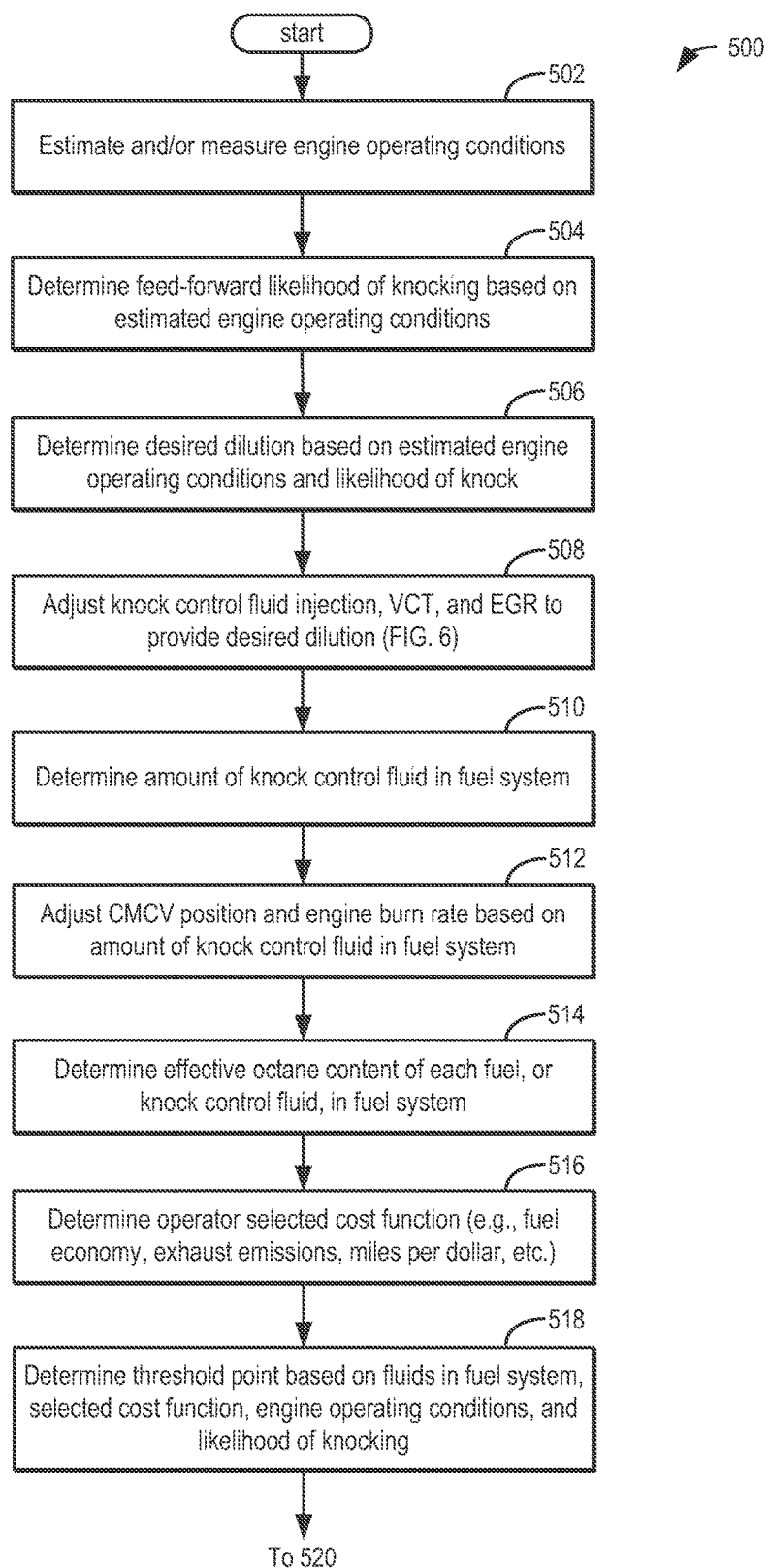
FIGS. 5A-B show a high level flow chart illustrating a routine that may be implemented for adjusting an amount of spark retard and a fuel injection to address engine knock.
Figure 5B:
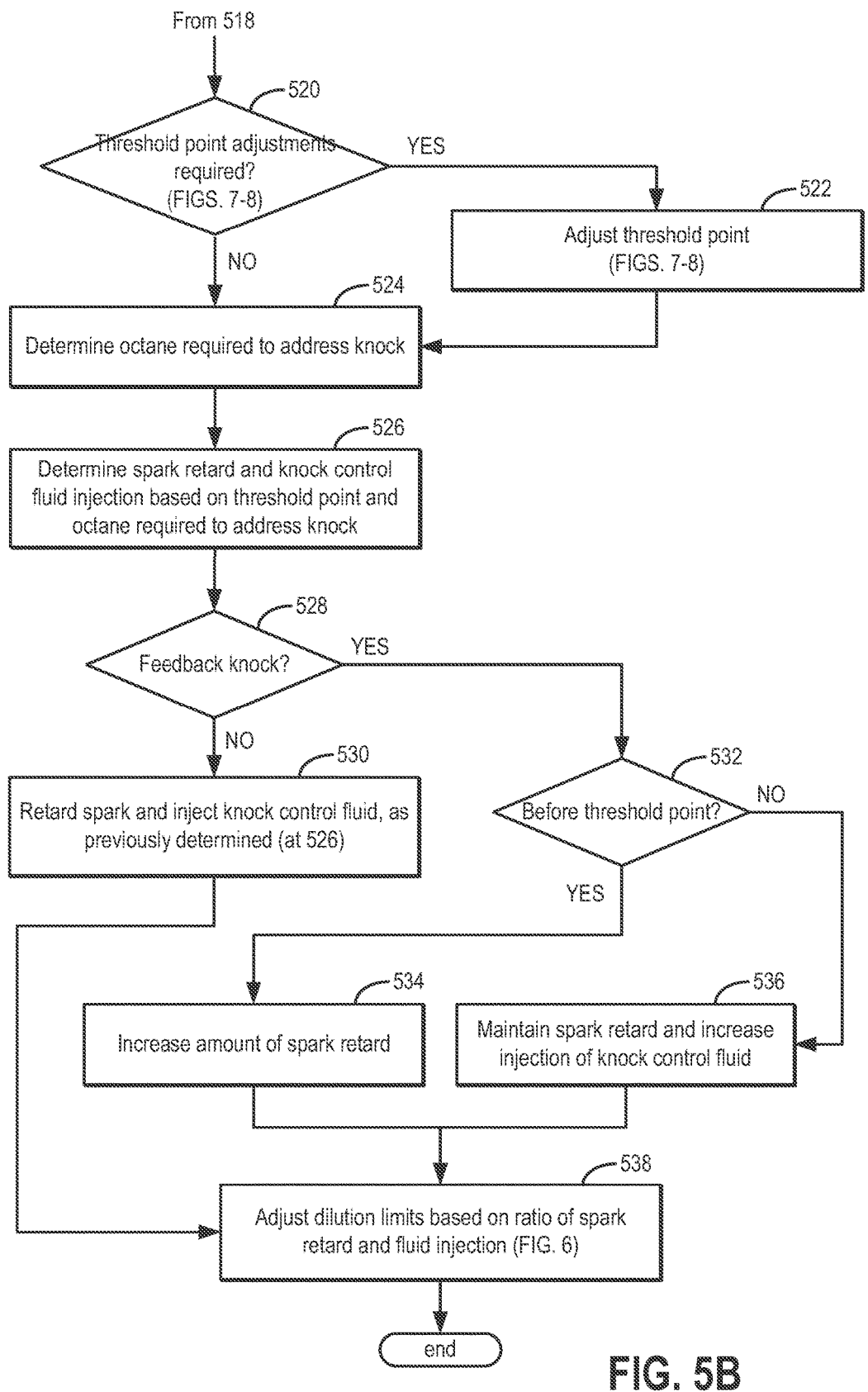

Now turning to FIGS. 5A-B, an example routine 500 is shown for adjusting a predetermined spark timing (or threshold point) up to which spark retard may be used for addressing knock, and after which an amount of a knock control fluid direct injected into the cylinder may be increased to address engine knock. By using at least some spark retard to address knock before increasing an amount of knock control fluid directly injected to address knock, substantial volumetric fuel economy benefits may be achieved.

At 502, engine operating conditions may be estimated and/or measured. These may include, for example, engine speed, desired torque, MAP, BP, ECT, catalyst temperature, intake air temperature, spark timing, boost, etc. At 504, a feed-forward likelihood of engine knocking may be determined based on the estimated engine operating conditions. At 506, a desired engine dilution may be determined based on the estimated engine operating conditions as well as the determined feed-forward likelihood of knock. At 508, and as further elaborated with reference to FIG. 6, a knock control fluid injection, VCT and EGR amount may be determined to provide the desired dilution. Specifically, based at least on the dilution effect of the injected knock control fluid, an amount of engine dilution provided by the injection may be determined, and a corresponding EGR and VCT adjustment may be performed. At 510, an amount of knock control fluid, or fuel, available in the fuel system of the engine may be determined. At 512, and as further elaborated in FIG. 6, the position of a charge motion control valve in the engine intake may be adjusted to thereby adjust an engine burn rate based on the availability of knock control fluid in the fuel system. At 514, an effective octane content of each fuel or knock control fluid in the engine's fuel system may be determined. Specifically, for flex-fuel vehicles, the effective octane content of each of the multiple fuels (such as primary and secondary fuels or knock control fluids) in the engine's fuel system may be determined. As previously elaborated, the effective octane content of each fuel or knock control fluid may be computed based on a combination of each fluid's inherent octane component (or fuel octane number), evaporative octane component or effect and dilution octane component or effect. In one example, one or more of these components or effects may be based on the alcohol content of the knock control fluid.

At 516, an operator selected cost function may be determined. The cost function may include, for example, volumetric fuel economy (miles per gallon), exhaust emissions, miles per dollar, etc. In one example, the vehicle operator may prefer fuel economy over exhaust emissions. In another example, the operator preferences may be weighted. For example, a customer may weigh a preference for fuel economy more heavily than a preference for lowest exhaust emissions. Operator preferences and inputs may be received from the vehicle operator through an interactive display device, such as a display on the vehicle dashboard for interacting with the vehicle operator, or a control panel on the vehicle display. Alternatively operator cost function preferences may be inferred based on previous driving behavior, for example, non-aggressive drivers may be assumed to prefer fuel economy.

At 518, based on the operator selected cost function, the estimated engine operating conditions, the estimated likelihood of engine knock, and the effective octane content of the available fuels or knock control fluids, a threshold point may be determined. Specifically, the predetermined timing up to which spark may be retarded (that is, the predetermined amount of retard) may be determined, and a ratio of usage of spark retard and direct injection of a knock control fluid may be determined to cumulatively provide an amount of octane to address the engine knock.

For example, one degree of spark retard may be correlated with a change of one octane number (1 ON). In another example, where E85 is the direct injected fuel and gasoline is the port injected fuel, the direct injection of E85 may provide a larger octane number change than a corresponding port injection of gasoline. For example, a 0.28% direct injection of E85 may be correlated with a change of 1 ON, while a 100% direct injection of E85 may be correlated with approximately 140 RON of port injected gasoline.

At 520, it may be determined whether further adjustments to the threshold point are required. As elaborated with reference to FIGS. 7-8, under some conditions, such as certain engine speed-load conditions, engine limitations may be present that may require the threshold point to be adjusted such that a larger or smaller amount of spark retard may be used and accordingly an adjustment to the knock control fluid injection amount may also be made. For example, under conditions where the demanded torque may become (at least transiently) limited, or exhaust temperature may become elevated, or particulate matter emissions may become elevated, or engine pre-ignition may occur, etc., the threshold point may be adjusted. Thus, if it is determined that threshold point adjustments are required, then at 522, and as elaborated in FIG. 8, the routine may adjust the predetermined timing. Specifically, under these conditions, the predetermined threshold may be adjusted (thereby adjusting an amount of spark retard and knock control fluid injection amount used to mitigate knock), even though there may be a temporary loss in the operator selected cost function due to the adjustment, so as to address the mentioned engine limitations.

In one example, the predetermined timing may be stored in a look-up table in the controller's memory wherein a predetermined amount of spark retard and an amount of direct knock control fluid injection may be tabulated for a given speed-load condition and a given knock control fluid.

As such, the readings of the look-up table may have been previously computed using maps, such as the maps of FIGS. 3-4, comparing cost function losses due to spark retard with cost function losses for different fuel or fluid combinations. Further adjustments to the predetermined timing, and the direct injection, may also be tabulated for selected engine speed-load windows, such as those depicted in the map of FIG. 7.

If no threshold point adjustments are required at 520, or after threshold point adjustments are complete at 522, then at 524, an octane required to address the anticipated knock may be computed. As previously elaborated, knocking may be addressed by retarding spark and/or increasing an octane number of the knock control fluid injected in the cylinder. As such, a larger octane number may be required in the cylinder if ignition timing is kept at MBT while a smaller octane number may be required in the presence of spark retard. Thus, by adjusting an amount of spark retard and an amount of knock control fluid injected into the cylinder, an effective octane of the cylinder may be adjusted to address knock.

At 526, based on the determined (and adjusted) predetermined timing, and further based on the octane required to address the anticipated knock, an amount of ignition spark timing retard and a knock control fluid injection profile may be determined for the engine. The knock control fluid injection profile may include an amount of a first fuel or knock control fluid to be direct injected and an amount of a second fuel to be port injected into the cylinder. For example, a first amount of fluid (such as a first fuel) direct injected into a cylinder may be based on the molar (or volumetric) composition of the injected fluid and a dilution effect of the injected fluid. Then, a second amount of fluid (such as a second fuel) port injected into the cylinder may be based on the first amount of fluid injection. At 528, it may be determined whether engine knocking is occurring, that is, whether there is feedback knock. In one example, feedback knock may be determined using a knock sensor coupled to the engine. If no feedback knocking has occurred, then at 530, the controller may proceed to operate the engine by retarding spark up to the predetermined timing and injecting fuel or knock control fluid according to the profile previously determined at 526.

If feedback knock is determined, then at 532, it may be determined whether spark timing is still before the predetermined timing, that is, if still more spark retard is possible. If yes, that is, if spark retard is not limited, the controller may address the feedback knock by continuing to retard the ignition spark timing up to the predetermined timing at 534. As such, this may constitute a relatively faster and more immediate feedback knock mitigation approach. In one example, once the feedback knock is addressed, the ignition spark timing may be returned to the original value (that is, the value responsive to feed-forward knock likelihood) while a direct fuel injection is slowly phased in. In comparison, if the settings are after the predetermined timing, that is, if spark retard is limited, then at 536, the controller may address the feedback knock by maintaining spark retard at the predetermined timing while increasing an amount of fuel or knock control fluid that is direct injected into the cylinder. As such, this may constitute a relatively slower approach to mitigate feedback knock. As further elaborated with reference to FIGS. 10-11, the adjustments may also be made based on the amount of fuel or fluid required to address the knock, and injector pulse width limitations as compared to that amount. Irrespective of the adjustments made to the predetermined timing, at 538, and as further elaborated in FIGS. 6 and 12, dilution limits of the engine may be adjusted based on the predetermined amount of retard (or predetermined timing), the amount of knock control fluid/fuel injected, as well as at least the dilution effect of the injected fluid, to compensate for EGR and torque transients.

In one example, an engine may be configured with direct injection of E85 and port injection of gasoline. Based on engine operating conditions, a likelihood of knock may be determined and the predetermined timing may be determined to be 11 degs of spark retard. To address the feed-forward anticipated knock, the controller may use a setting of 5 degs of spark retard and 10% ethanol direct injection. That is, the settings may be before the predetermined timing. In response to feedback knock, the controller may immediately address the knock by gradually retarding spark ignition timing from 5 degs of spark retard up to the predetermined timing of 11 degs of spark retard. After the ignition timing has reached 11 degs of spark retard, further feedback knock may be addressed by maintaining spark timing retarded at 11 degs while increasing the direct injection of E85 from 10% to 12%. Alternatively, if after using 11 degs of spark retard, the feedback knock is mitigated, the controller may advance the spark timing (that is, reduce the amount of spark retard) to 5 degs of spark retard and increase E85 direct injection to 12%.

In an alternate example, based on engine operating conditions, the feed-forward likelihood of knock may be addressed by a setting of 11 degs of spark retard and 8% ethanol direct injection. That is, the settings may be beyond the predetermined timing. Herein, in response to feedback knock, spark retard may be maintained at the predetermined amount of spark retard, herein 11 degs of retard, while the E85 injection is increased from 8% to 12%.

In this way, engine knock may be addressed by retarding spark up to a predetermined timing of a threshold point, and after spark retard has reached the threshold timing, the controller may address further knock by maintaining spark retard and increasing the injection of a knock control fluid into the cylinder to thereby provide the required effective octane to address engine knock.

An example usage of spark retard and direct injection of an ethanol fuel to address knock is illustrated in map 900 of FIG. 9. Map 900 illustrates an octane required to address knock along the x-axis, an amount of ignition spark timing retard along a first y-axis 901 and an amount (in %) of direct injection of an ethanol fuel (herein E85) along a second y-axis 902. In the depicted example, based on engine operating conditions, the molar composition and combination of the inherent octane effect, dilution effect, and evaporation effect of E85, and the operator selected cost function of fuel economy, a predetermined timing 904 may be determined. In this example, predetermined timing 904 may correspond to 11 degs of spark retard. Thus, as the octane required to address knock increases, spark may be retarded (dashed line 906) to mitigate the knock since the fuel economy loss associated with the thermal efficiency penalty of spark retard may be less than the volumetric fuel economy loss associated with the decreased energy content of E85. Spark retard may be used until a predetermined amount of retard, or predetermined timing 904, is reached. For example, in response to knocking, spark may be retarded to 5 degs of spark retard, and as knocking continues, spark may be retarded up to 11 degs of spark retard. After predetermined timing 904 is reached, the volumetric fuel economy penalty associated with E85 may be lower than that associated with the spark retard. Thus, after predetermined timing 904 is reached, spark may be held at 11 degs of retard, and direct injection of E85 may be increased (solid line 908) to fulfill the additional octane requirement. As previously elaborated, the predetermined amount of retard, or predetermined timing and amount of knock control fluid direct injected may be adjusted based on a composition (e.g., molar or volumetric composition) of the injected fluid. In the depicted example, the injected fluid is a blended fuel including a first fuel and a second fuel. Thus, herein, the molar composition of the blended fuel is based on the volumetric fraction, molecular weight, and density of each of the first and second fuels in the blended fluid. The adjustments may include, for example as shown, retarding the predetermined timing further away from MBT as the molar fraction of alcohol (herein ethanol) in the blended fuel increases. Similarly, the amount of fluid direct injected may be decreased as the molar fraction of alcohol in the blended fluid increases.

Now turning to FIG. 6, an example routine 600 is shown for adjusting one or more engine operating parameters to thereby adjust an engine dilution and an engine burn rate. Specifically, an engine operating parameter may be adjusted to thereby adjust an engine dilution based at least on the dilution effect of a knock control fluid direct injected in response to engine knock, as well as the availability of the knock control fluid.

At 602, a desired percent dilution may be determined based on the estimated engine operating conditions. In one example, a higher percent dilution may be desired as an engine load increases to reduce the likelihood of engine knock, as well as to improve engine NOx emissions, but subject to a combustion stability limit. As such, an engine dilution may be affected by one or more of an amount of EGR, VCT, and the dilution effect properties of a direct injected knock control fluid. At 604, an amount of knock control fluid (such as water, ethanol, methanol, alternate fuels, etc.) available in the engine's fuel system may be determined. In one example, this may include estimating a fuel level from a fuel level sensor coupled to the fuel tank of the selected fluid.

At 606, it may be determined whether the amount of knock control fluid available exceeds a threshold. In one example, the threshold may be based on an amount of fluid required to address knock (for example, a minimum amount required to address knock). If the amount of fluid is greater than the threshold, then at 608, a volume of the knock control fluid required to provide the desired engine dilution may be determined.

At 610, a volume of the knock control fluid required to address a feed-forward likelihood of knock may be determined. As previously elaborated, the amount of knock control fluid injected may be based on the engine speed and load and other operating conditions, and further based on a combination of an inherent octane effect, a dilution effect, and an evaporation effect of the injected fluid. At 612, the maximum of the volume required to provide the desired engine dilution and the volume required to address knock may be injected into the cylinder. At 614, a CMCV coupled to the engine intake upstream of the injectors, may be adjusted (for example, opened) to decrease an engine burn rate while injection of the knock control fluid is increased. Specifically, by adjusting (e.g., opening) the CMCV at higher engine loads to decrease an engine burn rate at the higher engine loads, cylinder peak pressure and rate of pressure rise may be reduced to allow engine operation at higher loads. At the same time, knock resulting from the reduced engine burn rate can be advantageously addressed by increasing the direct injection of the knock control fluid while the CMCV is adjusted to decrease the engine burn rate. As such, while the CMCV is opened and the knock control fluid is injected, ignition spark timing may be maintained at a predetermined amount of spark retard. The predetermined amount of spark retard may also be based on the engine load, and on the combination of the inherent octane effect, dilution effect, and evaporation effect of the injected fluid.

In one example, a controller may adjust whether the CMCV is opened at high engine loads based on the availability of the knock control fluid. For example, the adjustment may include opening the CMCV while operating the engine at high engine loads if the availability of the knock control fluid (for example, as inferred from a fuel level) exceeds a threshold. The adjustment may be further based on the composition of the knock control fluid injected. For example, the CMCV may be opened while operating the engine at the higher engine load as the alcohol content of the (sufficiently available) knock control fluid increases.

If the amount of knock control fluid available does not exceed the threshold, then at 618, the available amount of knock control fluid is direct injected. Then, at 620, the CMCV is adjusted (for example, closed) to increase the engine burn rate since sufficient levels of the knock control fluid to address knock arising from a decrease in engine burn rate is not available. In this way, by adjusting the operation of the CMCV, particularly at high engine loads, based on the availability of a knock control fluid, an engine burn rate may be coordinated with knock suppressing operations.

At 616 and 622, one or more engine operating parameters may be adjusted based on the CMCV adjustment and/or the direct injection of knock control fluid so as to maintain engine torque and a desired engine dilution. In one example, one or more of a throttle opening, an amount of EGR, VCT, spark advance, valve lift, and/or engine boost may be adjusted based on the injection. The engine operating parameter may be adjusted based at least on the dilution effect of the injected fluid. In one example, the engine operating parameter adjusted may include an amount of EGR (or EGR flow). Herein, the adjustment may include, when the injected fluid has a higher dilution effect, increasing the amount of direct injected fluid based on the dilution effect of the fluid, and decreasing the amount of EGR based on the increased amount of injected fluid. In comparison, when the injected fuel has a lower dilution effect, the amount of direct injected fluid may be decreased while maintaining the amount of EGR. In this way, the dilution provided by the EGR may be coordinated with the dilution provided by the injected knock control fluid.

In another example, the engine operating parameter adjusted may be a variable cam timing (VCT). Herein, the adjustment may include, when the injected fluid has a higher dilution effect, increasing the amount of direct injected fluid based on the dilution effect of the fluid, and using less "internal EGR" via VCT based on the increased amount of injected fluid. As such, the VCT adjustment required to decrease this dilution and provide less "internal EGR" may be based on the VCT configuration of the engine (e.g., whether it is intake only, exhaust only, dual equal, or dual independent). Thus, based on the VCT type, under some conditions, VCT may be retarded to decrease the dilution, while under other conditions, based on the VCT type, VCT may be advanced to decrease the dilution. In comparison, when the injected fuel has a lower dilution effect, the amount of direct injected fluid may be decreased while maintaining the "internal EGR" via VCT.

In still another example, the engine operating parameter adjusted may be an amount of valve lift, wherein the adjustment may include, when the injected fluid has a higher dilution effect, increasing the amount of direct injected fluid based on the dilution effect of the fluid, and decreasing an amount of dilution due to valve lift based on the increased amount of injected fluid. In comparison, when the injected fuel has a lower dilution effect, the amount of direct injected fluid may be decreased while maintaining the amount of dilution due to valve lift. Still other combinations of EGR, VCT, and valve lift adjustments may be possible An alternate engine operating parameter may also be adjusted. For example, an engine boost may also be adjusted based on the CMCV adjustment. In one example, if the amount of knock control fluid level is lower than the threshold, then the CMCV may be closed) to increase burn rate and avoid knock) while reducing engine boost. In this case, maximum engine torque or boost may be reduced to avoid excessively high cylinder pressure and/or rate of pressure rise. In another example, if the amount of knock control fluid is lower than the threshold, the CMCV may be closed while retarding spark timing.

At 624, it may be determined whether any changes in the ratio of fuel injection to spark retard have been made in response to feedback knock, as previously elaborated in FIG. 5B (at 528). If no, the routine may end. If adjustments were made to the ratio, then at 626, an amount of knock control fluid injected may be limited, and/or one or more of VCT, EGR, valve lift, spark timing, boost, etc., may be adjusted based on the change in fuel injection to spark retard ratio so as to maintain the desired engine dilution and torque output.

In this way, by adjusting whether the CMCV is opened at high engine loads based on the availability of a knock control fluid, and by adjusting knock control fluid injection based on the CMCV opening, CMCV operations may be adjusted based on the availability of a knock control fluid, while an engine operating parameter, such as boost, is used to compensate torque transients, and an alternate engine operating parameter, such as VCT, EGR, or valve lift is used to compensate for dilution transients. Thus, during a first condition, when the amount of knock control fluid is greater than a threshold, the CMCV is opened at higher engine loads, while increasing injection of the knock control fluid. In comparison, during a second condition, when the amount of knock control fluid is lower than the threshold, the CMCV is closed at higher engine loads, while reducing engine boost. Alternatively, the CMCV may be closed and spark timing may be retarded Now turning to FIG. 7, a map 700 is shown for further adjusting the threshold point, or predetermined timing between usage of spark retard and direct fuel injection. Specifically, map 700 identifies regions (herein displayed as regions 701-706), based on speed-load windows, wherein the threshold point may be adjusted, with the predetermined amount of spark retard increased or decreased, and direct injection of a fuel or knock control fluid correspondingly decreased or increased, to address alternate engine limitations.

In first region 701 of the map, characterized by medium load (BMEP) and medium speed conditions, the threshold point, as determined in FIGS. 5A-B, may remain unadjusted. That is, in region 701, a ratio of spark retard and fuel injection may be used to address knock based on the engine operating conditions, the octane content of the fuel, and the operator selected cost function, as elaborated in FIGS. 5A-B.

Region 702 may be characterized by high speed and high load conditions. In this region, the threshold point may be adjusted for exhaust temperature and particulate matter limitations. Specifically, at high load and high speed conditions, exhaust temperatures may be elevated. The use of spark retard under such conditions may lead to additional unburned fuel in the exhaust which may further elevate the exhaust temperature. Further, this may increase particulate matter emissions. In comparison, the use of an ethanol fuel injection may provide the benefits of both the charge cooling effects of ethanol in reducing the elevated exhaust temperatures, as well as lower particulate matter emissions of ethanol fuels (as compared to gasoline). In the case of a boosted engine, reduction of exhaust temperatures may also help to reduce a turbine inlet temperature, thereby reducing turbocharger durability issues and minimizing enrichment related to elevated turbine inlet temperatures. Thus, in region 702, the threshold point may be adjusted to reduce the predetermined amount of spark retard used to address knock, and correspondingly increase the amount of knock control fluid that is direct injected to address the knock. As such, this may lead to a temporary drop in volumetric fuel economy, however, that may be accepted in view of the exhaust temperature and particulate matter limitations.

Region 703 may be characterized by very high speed and load conditions. In this region, the exhaust temperature and particulate matter limitations may be more limited than those previously discussed for region 702. Thus, to curb highly elevated exhaust temperatures and particulate matter emissions, the predetermined amount of spark retard may be further reduced and a knock control fluid injection may be further increased. In one example, substantially no spark retard may be used, and knock may be substantially or completely addressed using knock control fluid injection. Further still, the knock may be more aggressively addressed by at least transiently operating the cylinders with a rich injection of the knock control fluid.

Region 704 may be characterized by low speed and high load conditions. Under such conditions, the engine may be prone to pre-ignition combustion events. In this region, the pre-ignition limitation may be addressed by adjusting the threshold point such that the predetermined amount of spark retard used is reduced while an amount of knock control fluid injection is increased. In one example, substantially no spark retard and substantially all knock control fluid injection may be used to reduce the likelihood of pre-ignition.

Region 705 may be characterized by low speed and medium load conditions. Under such conditions, cooled-EGR may be limited. For example, there may be a delay in attaining the desired amount of cooled-EGR. Herein, the cooled-EGR limitation may be addressed by adjusting the threshold point such that the predetermined amount of spark retard is increased while an amount of knock control fluid injected is decreased. Alternatively, if spark retard is limited, the injection of a knock control fluid, especially one with a higher dilution effect (such as water), may be increased. Additionally, multiple compression stroke injections of the knock control fluid may be used for EGR management. Engine dilution adjustments based on coordination of EGR flow with the direct injection of a knock control fluid with a high dilution effect (such as water) is further elaborated herein with reference to FIG. 12.

Region 706 may be characterized by low speed and low load conditions. Under such conditions, torque may be limited. In particular, during tip-in (for example, from a light load to a medium load), the use of spark retard may cause torque transients such that the driver-demanded torque is not met. Thus, to reduce the occurrence of torque transients, the threshold point may be adjusted such that an amount of spark retard used is decreased while an amount of knock control fluid injection (such as, an amount of water direct injected) is increased. Additionally, multiple compression stroke injections of the fluid may be used for torque management. In boosted engines, the use of increased knock control fluid injection may also help to address turbo lag issues. For example, the use of increased knock control fluid injection at low speed-low load conditions may enable rapid turbocharger boost build-up and improve turbocharger transient torque control.

Now turning to FIG. 8, an example routine 800 is shown for adjusting the threshold point (that is, predetermined timing) for usage of spark retard and a direct injection of a knock control fluid based on various engine operation limitations.

At 802, an amount of spark retard and an amount of knock control fluid injection may be determined, based on engine operating conditions and the predetermined threshold point (or predetermined amount of retard), as previously elaborated in FIGS. 5A-B. At 804, it may be determined if there are any torque limitations. In one example, torque limitations may be present at low speed and low load conditions, such as shown in region 706 of FIG. 7. At 806, the torque limitations may be addressed by adjusting the threshold point such that an amount of spark retard is reduced while an amount of knock control fluid injection is increased. For example, the ignition spark timing may be advanced towards MBT when the engine torque is below a requested (e.g., driver demanded) torque. Additionally, multiple compression stroke fuel injections may be used to address torque transients under such conditions. For example, a number of compression stroke injections may be increased when the engine torque is below the requested torque.

At 808, it may be determined if there are any exhaust temperature limitations. In one example, elevated exhaust temperatures may occur at high and very high speed and load conditions, such as shown in regions 702 and 703 of FIG. 7. Under such conditions, the use of spark retard may lead to elevated exhaust temperatures. In contrast, a direct injected knock control fluid may provide a charge cooling effect that reduces knock and spark retard, leading to lower exhaust temperatures. Elevated exhaust temperature issues may also lead to turbocharger issues due to elevated turbine inlet temperatures. At 810, the exhaust temperature limitations may be addressed by adjusting the threshold point such that an amount of spark retard is reduced while an amount of knock control fluid injection is increased. Specifically, ignition spark timing may be advanced towards MBT as the exhaust temperature exceeds an upper threshold, while the spark timing may be retarded further away from MBT as the exhaust temperature falls below a lower threshold. Under some conditions, such as at very high speed and load conditions, substantially no spark retard may be used (that is, ignition timing may be held at MBT) while substantially all the octane requirement may be met by the knock control fluid injection. In one example, where the injected fuel is the ethanol fuel E85, the exhaust temperature limitations may be addressed by at least transiently running rich on the ethanol fuel. Furthermore, the increased direct injection of knock control fluid may be provided using multiple compression stroke injections.

At 812, it may be determined if there are any particulate matter (PM) limitations. In one example, elevated particulate matter emissions may occur at high and very high speed and load conditions, such as shown in regions 702 and 703 of FIG. 7. Under such conditions, the use of spark retard may increase an amount of unburned fuel in the exhaust, leading to elevated PM emissions. In contrast, ethanol fuels may inherently generate lower levels of PMs. The PM limitations may be addressed at 810 by adjusting the threshold point such that an amount of spark retard is reduced while an amount of knock control fluid injection is increased. Specifically, spark timing may be advanced towards MBT as the exhaust particulate matter emission level increases (e.g., exceeds a threshold).

At 814, it may be determined if there is a likelihood of pre-ignition. In one example, pre-ignition may occur at low speed and high load conditions, such as shown in region 704 of FIG. 7. Under such conditions, the use of spark retard may increase the occurrence of pre-ignition. In contrast, ethanol fuels may generate a charge cooling effect that may reduce the occurrence of pre-ignition. Thus, at 810, the pre-ignition limitation may be addressed by adjusting the threshold point such that an amount of spark retard is reduced while an amount of knock control fluid injection is increased. In one example, the likelihood of pre-ignition may be inferred from knock intensity. Herein, the adjustment may include advancing the spark timing towards MBT as the knock intensity exceeds a pre-ignition threshold.

At 816, it may be determined if there are cooled-EGR limitations. In one example, cooled EGR may become limited at low speed and medium load conditions, such as shown in region 705 of FIG. 7. Under such conditions, the injection of a secondary fluid, such as an ethanol fuel, water, or washer fluid, may generate a dilution effect that may rapidly provide the desired dilution while the cooled EGR is limited. Specifically, if under the low speed-medium load conditions, the cooled EGR level is not as high as requested, then by injecting a knock control fluid, the desired dilution may be substantially immediately provided, while the EGR flow is increased. Knock control fluid injection adjustments in coordination with EGR flow to provide a desired dilution are further elaborated herein with reference to FIG. 12. Thus, at 818, an amount of spark retard may be increased, if spark retard is not already limited. However, if spark retard is already limited, then the cooler EGR limitation may be addressed by maintaining spark retard and increasing an amount of knock control fluid (such as water) that is injected into the cylinder.

At 820, it may be determined if the engine cooling system is a smart cooling system. As such, smart cooling systems may be configured to provide a plurality of engine temperature settings, based on a plurality of engine coolant temperature (ECT) settings. If yes, then at 822, the controller may adjust the smart cooling system to operate the engine cooling system with a first, lower engine temperature setting during the ignition timing retard (that is, before the threshold point), and with a second, higher engine temperature setting during the direct injection (that is, after the threshold point). By using a lower ECT setting with the spark retard and a higher ECT setting with the fuel injection, engine performance may be improved.

At 824, the controller may operate the engine with knock addressed using spark timing retarded up to the threshold point, and after spark has been retarded up to the threshold point, increasing a direct injection of a knock control fluid while maintaining spark timing at the threshold point.

Now turning to FIGS. 10 and 11, example adjustments of retarding ignition spark timing and increasing direct injection of a knock control fluid in response to knock are illustrated. Specifically, the examples illustrate adjustments based on the amount of knock control fluid direct injected as related to the pulse width of the direct injector.

In map 1000 of FIG. 10, changes in spark ignition timing retard (spark retard) are depicted in graph 1002 while changes in an amount of knock control fluid direct injected are depicted in graph 1004. During a first condition, at t1, in response to an indication of knock (depicted by an arrow), an ignition spark timing may be retarded (that is, spark retard may be increased) up to a predetermined timing 1003 (that is, up to a predetermined amount of retard). At the same time, the amount of knock control fluid directly injected may be maintained. At t2, after the ignition spark timing has reached the predetermined amount of retard, or predetermined timing 1003, spark timing may be maintained at the predetermined amount of retard, while an amount of knock control fluid directly injected to suppress engine knock is increased. As such, the amount of direct injection may be determined based on engine operating conditions. For example, in the first condition depicted in FIG. 10, the amount of direct injection required to address the knock at t2 may be a first (higher) amount 1008. Herein, first amount 1008 may be greater than the minimum pulse width 1006 of the direct injector. At t3, in response to additional knock, the amount of fuel directly injected to suppress engine knock may be further increased while ignition spark timing is maintained at the predetermined amount of retard.

Turning to FIG. 11, map 1100 depicts changes in spark ignition timing retard (spark retard) at graph 1102 while changes in an amount of knock control fluid direct injected are depicted in graph 1104. During a second condition, at t1, in response to the indication of knock, as in the first condition shown in FIG. 10, ignition spark timing may be retarded (that is, spark retard may be increased) up to predetermined timing 1003. At the same time, the amount of knock control fluid direct injected may be maintained. At t2, after the ignition spark timing has reached predetermined timing 1003, spark timing may be maintained at the predetermined timing, while an amount of knock control fluid directly injected to suppress engine knock is increased. In the second condition depicted in FIG. 11, the amount of direct injection required to address the knock at t2 may be a second (lower) amount 1108. Herein, second amount 1108 may be smaller than the minimum pulse width 1006 of the direct injector. As such, it may not be possible to provide the second smaller amount of direct injection that is smaller than the pulse width of the injector. Thus, at t2, the direct injector may be limited and may inject an amount corresponding to the minimum pulse width of the injector. That is, the injector may inject an amount that is greater than the amount required to address the knock (that is, greater than 1108). Thus, to compensate for the difference, when the required injection amount is lower than the minimum pulse width of the direct injector, spark timing may be advanced from the predetermined amount of retard while increasing the amount of knock control fluid directly injected into the engine. The spark timing advance may be adjusted based on a difference between the amount of injection required and the pulse width of the injector. For example, the amount of spark advance may be increased, or an amount of spark retard may be decreased, as a difference between the amount of knock control fluid that is required to be directly injected to address knock and the minimum pulse width of the injector increases. Then, at t3, in response to additional knock, ignition timing may be retarded again up to the predetermined timing 1003. At t4, after ignition timing has reached the predetermined timing, further knock may be addressed by increasing the amount of knock control fluid directly injected to suppress engine knock while maintaining ignition spark timing at the predetermined timing.

Now turning to FIG. 12, map 1200 shows an example adjustment of direct injection of water (or a knock control fluid containing some water or other non-combustible fluid) with EGR flow to provide a desired dilution. By adjusting the direct injection in coordination with EGR flow, a desired dilution may be provided while EGR transient control problems are reduced. Map 1200 depicts changes in an amount of water direct injected at graph 1202, changes in an EGR flow at 1204, changes in engine dilution at 1206, and changes in VCT at 1208. It will be appreciated that while the depicted example is illustrated using water as the knock control fluid, in alternate example, the knock control fluid may be ethanol, methanol, another alcohol, wiper fluid, or combinations thereof.

Before t1, based on engine operating conditions (such as, an engine speed and load condition), a desired dilution may be determined. Based on the desired dilution, an EGR flow, a VCT setting, and a water injection amount may be determined. In one example, at t1, a sudden increase in engine dilution and EGR flow may be requested. The increase in EGR flow may be requested, for example, during a pedal tip-in (which in turn leads to a throttle tip-in). Accordingly, at t1, an amount of EGR flow may be increased. In one example, the EGR flow may be an LP-EGR flow received through an LP-EGR passage coupled between the engine intake upstream of a turbocharger compressor and the engine exhaust downstream of a turbocharger turbine. However, in alternate examples, the EGR flow may be a HP-EGR flow received through an HP-EGR passage coupled between the engine intake downstream of a turbocharger compressor and the engine exhaust upstream of a turbocharger turbine. The LP-EGR flow may be increased (graph 1204) by the actuation of an LP-EGR valve in the LP-EGR passage. However, there may be a delay from the time the LP-EGR valve is actuated and the time that the increased EGR flow is achieved and received at the cylinder. Specifically, the delay in mixing of EGR gases with intake air to achieve the desired EGR amount/flow and the arriving of the mixed EGR flow at the cylinder may lead to EGR transients that may transiently degrade engine efficiency. Herein, to compensate for the EGR transients, at t1, during an increase in LP-EGR flow (such as, from a first amount of EGR to a second, higher, amount of EGR), a water injection may be increased to a first water injection amount. Herein, the substantially immediate vaporization of the direct injected water may provide a substantially immediate dilution effect in the cylinder that compensates for the EGR transients and allow the desired dilution to be substantially immediately provided. The amount of direct injection may be based on the amount of EGR in the EGR flow. Then, the water injection may be decreased to a second water injection amount lower than the first amount. As shown in graph 1202, the rate of increasing the water injection may be faster than the rate of decreasing the water injection. By adjusting and coordinating the water injection and the EGR flow, the desired dilution may be immediately provided.

At t2, in response to a decrease in requested dilution, EGR flow (e.g., LP-EGR flow) may be decreased. In one example, the decrease in LP-EGR flow may be requested during a pedal tip-out. Herein, during the decrease in LP-EGR flow, water injection may also be immediately decreased (to allow an immediate drop in dilution) after which the water injection amount may be gradually increased.

In one example, due to knock concerns, it may be desired to keep the amount of water direct injected within an upper threshold 1201 and a lower threshold 1203. Thus, during the increase or decrease in LP-EGR flow, a VCT may be adjusted based on the water injection amount and further based on the EGR flow. For example, during the decrease in LP-EGR flow initiated at t2, when the water injection amount required is smaller than lower threshold 1203, the water injection amount may only be reduced to the lower threshold and held there for an amount of time between t2 and t3 (as depicted by dotted segment 1207), while a VCT timing is retarded (graph 1208) for the same amount of time (between t2 and t3). Herein, by adjusting VCT based on the direct injection amount, the water injection may be kept at a threshold required to maintain knock while the desired engine dilution is provided at least partly by the VCT. In an alternate example (not depicted), during an increase in LP-EGR flow, VCT may be advanced when the water injection amount required is greater than the upper threshold. Herein, the water injection may be held for an amount of time (e.g., transiently) at the upper threshold amount while VCT is advanced for the same period. It will be appreciated that the VCT adjustment used (e.g. VCT retard or advance) may be based on the VCT type. Thus, when the VCT is a first type, VCT advance may be used, and when the VCT is a second type, VCT retard may be used, to achieve the desired dilution effect.

A timing with reference to engine load of the increasing water injection in response to an increase in EGR flow may be adjusted based on the EGR flow and the engine torque. For example, the adjustment may include increasing the water injection at lower engine loads when the EGR flow is below a threshold and the engine torque is lower, and decreasing the water direct injection as the EGR flow exceeds the threshold. For example, as shown at t4, in response to engine load being lower than a threshold, and EGR flow being lower than a threshold, an amount of water direct injected may be gradually increased. Herein, at the lower engine load, in anticipation of an increase in engine load (such as, due to a sudden tip-in), and in anticipation of EGR transients arising from the delay in increasing an EGR flow, direct injection of water may be increased, albeit by a smaller amount, to at least partly provide some of the engine dilution that may be requested during the anticipated increase in engine load. In an alternate example (not depicted), at higher engine loads (that is, when engine load is higher than a threshold, and EGR flow is higher than a threshold), a decrease in engine load (such as, due to a sudden tip-out) may be anticipated. Further, in anticipation of EGR transients arising from the delay in decreasing the EGR flow, direct injection of water may be decreased, albeit by a smaller amount, to at least partly reduce some of the engine dilution decrease that may be requested during the anticipated decrease in engine load. In either case, the rate of increasing the water injection may be faster than the rate of decreasing the water injection to also better compensate for EGR transients. Thus, in effect, a load leveling may be performed in anticipation of load changes.

Herein, the direct injection of water may include an amount of water that is direct injected, as well as a rate of the direct injection. As such, the amount of direct injection may be based on the amount of EGR in the EGR flow. The water direct injection may also be adjusted based on the presence of an HP-EGR flow. It will be appreciated that while the depicted example is described in the context of a water direct injection, this is not meant to be limiting, and that in alternate examples, the direct injected fluid may a knock control fluid such as ethanol, methanol, other alcohols, water, gasoline, wiper fluid, and combinations thereof. Therein, the amount and timing of the direct injection may be adjusted at least based on the dilution effect of the injected fluid.

In this way, by better anticipating changes in engine dilution based on engine load conditions, and by adjusting an amount of water direct injected into an engine cylinder in coordination with an EGR flow, EGR transient control problems may be better anticipated and addressed. Further, by adjusting an operating parameter such as VCT, spark advance or boost, based on the amount of water injected, knock may be addressed while also providing the desired engine dilution.

Now turning to FIG. 13, example adjustments of a direct injection timing, in relation to intake valve closing timing (IVC), with throttle adjustments to compensate for torque transients are illustrated. Specifically, an amount of knock control fluid (such as fuel, water, ethanol, etc.) may be direct injected to an engine based on engine operating conditions while an engine throttle position may be adjusted based on the knock control fluid injection amount and injection timing. In a non-limiting example, the knock control fluid includes water, though in alternate embodiments, a different knock control fluid may be used. Map 1300 depicts a timing of direct injection of water at graph 1301. Specifically, two example injections are depicted at 1302 and 1303. As such, each injection timing is illustrated in context of its relation to IVC. Corresponding throttle adjustments are depicted in graph 1304.

At 1302, a first direct injection of water is shown. The direct water injection may be adjusted based on one or more of knock, a desired engine dilution, and EGR transients. As such, the direct water injection may include adjustments to a timing and/or an amount of the injection. In the depicted example, the first injection timing may be such that substantially all the water is injected before IVC. Thus, substantially all the injected water may vaporize and occupy the space of aircharge in the cylinder. Herein, to compensate for decreased volumetric efficiency arising from the cylinder filling effect of the injected water, the engine throttle opening may be adjusted to a first, larger amount, the amount based on the amount and timing of water injected, in order to attain the desired torque. While the depicted example shows the entire first injection timing before IVC, in an alternate example, at least part of the first injection timing may be before IVC.

In comparison, at 1303, a second direct injection of water is shown. In the depicted example, the second injection timing, later than the first injection timing, may be such that substantially all the water is injected after IVC. That is, the second injection timing is more retarded from IVC than the first injection timing. Thus, at the time that air is trapped in the cylinder (IVC), a smaller proportion of the injected water may occupy the space of aircharge in the cylinder, generating less impact on volumetric efficiency. Herein, to attain the desired torque with higher volumetric efficiency, the engine throttle may be adjusted to a second, lower opening amount, the amount based on the amount and timing of the water injection.

The timing and amount of the injected knock control fluid (herein water) may be adjusted with respect to IVC based on engine operating conditions. The engine operating conditions may include one or more of knock, desired engine dilution, and EGR transients. Thus, in one example, the injection timing may be advanced from IVC when volumetric efficiency is not a constraint, and maximum water vaporization and mixing is desired. In another example, the injection timing may be retarded from IVC as volumetric efficiency becomes a constraint on amount of water injected. In still another example, injection timing may be retarded from IVC as knocking increases or as the desired engine dilution increases. It will be appreciated that as the timing of the injection in relation to IVC changes, the time available for water vaporization before IVC may vary, thereby changing the amount of water that vaporizes before IVC and occupies the space of aircharge trapped in the cylinder. As such, the relationship may be linear only on a molar basis. In any case, based on the expected amount of cylinder filling, a throttle adjustment may be made.

While the depicted example is described in the context of a water direct injection, this is not meant to be limiting, and in alternate examples, the direct injected fluid may a knock control fluid such as ethanol, methanol, other alcohols, water, gasoline, and combinations thereof. Therein, the amount of knock control fluid injected may be adjusted based on a combination of the inherent octane, dilution effect and evaporation effect of the injected fuel. For example, an amount of injected knock control fluid may be decreased as the evaporation effect of the injected fluid increases. In another example, the amount of injected fluid may be adjusted based on a molar composition or alcohol content of the injected fluid. Additionally therein, the engine throttle position may be further adjusted based on the dilution effect of the injected fluid.

While not depicted in FIG. 13, additional adjustments, such as one or more of an amount of VCT and EGR, may be adjusted responsive to the amount of direct injection, to provide a desired engine dilution. In one example, an amount of VCT and/or EGR may be decreased as the amount of knock control fluid injected increases. In this way, torque and EGR transients may be better anticipated and addressed.

In this way, by adjusting a threshold point between the use of spark retard and the direct injection of a knock control fluid, fluid usage may be more judicious and fuel economy benefits may be achieved. By adjusting the threshold point based on an alternate cost function, such as lower operation costs or lower exhaust emissions, engine performance may be maintained while providing the benefits of the selected cost function. By coordinating EGR, throttle, VCT, and boost adjustments based on the timing, amount, and nature of an injected knock control fluid, EGR transients and torque transients may be reduced while knock is addressed.

Note that the example control and estimation routines included herein can be used with various system configurations. The specific routines described herein may represent one or more of any number of processing strategies such as event-driven, interrupt-driven, multi-tasking, multi-threading, and the like. As such, various actions, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, functions, or operations may be repeatedly performed depending on the particular strategy being used. Further, the described operations, functions, and/or acts may graphically represent code to be programmed into computer readable storage medium in the control system It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of operating an engine including a CMCV, comprising,
   determining an availability of a knock control fluid;
   opening the CMCV at high engine loads if the availability of the knock control fluid exceeds a threshold; and
   closing the CMCV at high engine loads if the availability of the knock control fluid does not exceed the threshold.

2. The method of claim 1, wherein the opening is further based on a composition of the knock control fluid, wherein the knock control fluid is direct injected into an engine cylinder, and wherein the engine includes a turbocharger.

3. The method of claim 2, further comprising determining an alcohol content of the knock control fluid and wherein the opening includes opening the CMCV at high engine loads if the alcohol content of the knock control fluid exceeds a threshold content.

4. A method of operating an engine including a CMCV, comprising,
   determining an amount of a knock control fluid available in a fuel system of the engine;
   during a first condition that includes the amount of knock control fluid being greater than a threshold, opening the CMCV at high engine loads while increasing injection of the knock control fluid; and
   during a second condition that includes the amount of knock control fluid being lower than the threshold, closing the CMCV at high engine loads while reducing engine boost.

5. The method of claim 4, further comprising determining a CMCV opening, determining an engine boost adjustment amount based on the CMCV opening, and adjusting the engine boost by the engine boost adjustment amount.

6. The method of claim 5, wherein the adjustment is further based on a composition of the knock control fluid, wherein the knock control fluid is direct injected into an engine cylinder, and wherein the engine includes a turbocharger.

7. The method of claim 5, further comprising,
   during a third condition, when the amount of knock control fluid is lower than the threshold, closing the CMCV and retarding spark timing.

8. The method of claim 7, further comprising determining an alcohol content of the knock control fluid and, wherein the adjustment includes opening the CMCV at high engine loads if the alcohol content of the knock control fluid exceeds a threshold content.

9. An engine system comprising,
an engine;
a turbocharger configured to provide a boosted aircharge to the engine;
a CMCV configured to adjust an engine burn rate;
a direct injector configured to directly inject knock control fluid into an engine cylinder; and
a control system with computer readable instructions executable to,
determine a knock control fluid level;
adjust whether the CMCV is opened at a high engine load based on the knock control fluid level;
determine a CMCV opening;
adjust an engine boost based on the CMCV opening; and
open the CMCV to reduce an engine burn rate, while an amount of the knock control fluid is concomitantly increased to address knock.

10. The system of claim 9, wherein the instructions to adjust whether the CMCV is opened at the high engine load include instructions to open the CMCV at the high engine load if the knock control fluid level exceeds a threshold.

11. The system of claim 10, wherein the instructions are executable to determine engine operating conditions and a molar composition of the knock control fluid, and wherein the threshold is based on the engine operating conditions and the molar composition of the knock control fluid.

12. The system of claim 11, wherein the instructions are executable to determine an alcohol content of the knock control fluid, and wherein the threshold is decreased as the alcohol content of the knock control fluid increases.

13. The system of claim 10, wherein the threshold is further adjusted based on a dilution effect of the knock control fluid, the adjustment including decreasing the threshold as the dilution effect of the knock control fluid increases.

14. The system of claim 9, wherein the instructions to adjust the engine boost include instructions to reduce boost if the CMCV is closed at the high engine load.

* * * * *